(12) United States Patent
Shiraishi

(10) Patent No.: US 7,327,507 B2
(45) Date of Patent: Feb. 5, 2008

(54) OPTICAL BEAM SCANNING DEVICE HAVING TWO SETS OF Fθ MIRRORS WHERE THE MIRROR BASE AND MIRROR FACE HAVE DIFFERING COEFFICIENTS OF LINEAR EXPANSION

(75) Inventor: Takashi Shiraishi, Kanagawa-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 109 days.

(21) Appl. No.: 11/194,613

(22) Filed: Aug. 2, 2005

(65) Prior Publication Data
US 2007/0030550 A1 Feb. 8, 2007

(51) Int. Cl.
*G02B 26/08* (2006.01)
(52) U.S. Cl. .................................... 359/208
(58) Field of Classification Search ............... 359/208, 359/216–219
See application file for complete search history.

(56) References Cited

U.S. PATENT DOCUMENTS

| | | | | |
|---|---|---|---|---|
| 5,013,108 A * | 5/1991 | Van Amstel | ............... | 359/208 |
| 5,181,137 A * | 1/1993 | Koide | .................. | 359/217 |
| 5,408,095 A * | 4/1995 | Atsuumi et al. | ............ | 250/236 |
| 5,898,514 A * | 4/1999 | Okamoto | .................. | 359/205 |
| 6,052,211 A * | 4/2000 | Nakajima | .................. | 359/204 |
| 2002/0050562 A1* | 5/2002 | Yoshikawa et al. | ......... | 250/234 |
| 2003/0112485 A1* | 6/2003 | Nishihata et al. | ........... | 359/208 |
| 2004/0001240 A1* | 1/2004 | Nakai | ........................ | 359/204 |
| 2004/0169828 A1* | 9/2004 | Furuichi | ...................... | 353/98 |

FOREIGN PATENT DOCUMENTS

| | | |
|---|---|---|
| JP | 04-277715 A | 10/1992 |
| JP | 09-197319 | * 7/1997 |
| JP | 2000-275557 A | 10/2000 |
| JP | 2001-013441 A | 1/2001 |
| JP | 2001-013442 A | 1/2001 |
| JP | 2001-056445 A | 2/2001 |

OTHER PUBLICATIONS

DERWENT Summary of JP 09-197319, Ricoh KK.*
DERWENT Summary of JP 2001-056445, Minolta (cited in IDS).*

* cited by examiner

*Primary Examiner*—Stephone B. Allen
*Assistant Examiner*—Jennifer L Doak
(74) *Attorney, Agent, or Firm*—Foley & Lardner LLP

(57) ABSTRACT

An optical beam scanning device includes a rotating polygon mirror for scanning a beam from a pre-deflection optical system in a main scanning direction and two mirrors 23, 25 for imaging the beam scanned by the rotating polygon mirror 5 on an image plane. The device is arranged so that a first mirror 23 at the rotating polygon mirror side 5 has a negative power in the main scanning direction and a second mirror 25 at the image plane side has a positive power in the main scanning direction. Thereby, the degrees of freedom of shape and arrangement of process unit or the like can be made higher and an apparatus can be downsized by securing the distance between the last imaging element and the image plane while suppressing the increase in the optical path length between the reflection surface 5A of the rotating polygon mirror 5 and the image plane.

4 Claims, 9 Drawing Sheets

$$\beta = \frac{S_2}{S_1}$$

$$Z_2' - Z_2 \fallingdotseq \beta(Z_1' - Z_1) = \frac{\beta \Delta \tan\theta}{\cos\alpha}$$

OPTICAL BEAM SCANNING DEVICE HAVING TWO SETS OF Fθ MIRRORS WHERE THE MIRROR BASE AND MIRROR FACE HAVE DIFFERING COEFFICIENTS OF LINEAR EXPANSION

BACKGROUND OF THE INVENTION

The present invention relates to an optical beam scanning device including two mirrors for imaging a beam scanned by a rotating polygon mirror on an image plane.

In a scanning optical system using lenses for a post-deflection optical system of an exposure apparatus, there are design restrictions as achromatization for preventing displacement of beam position and imaging position according to variations in wavelength. This is because refractive indexes of lens materials become different according to the difference in wavelength. Contrary, a mirror has an advantage that it has less wavelength dependence, and inventions using mirrors for the scanning optical system have been made. As an example, there is a laser scanning device described in Japanese Patent Application Laid-Open (JP-A) No. 2001-56445.

In this laser scanning device, two mirrors are used in a post-deflection optical system as shown in FIGS. 1 and 2, and powers of the two mirrors in the main scanning direction are positive and positive, respectively.

Accordingly, a principal point by the two mirrors is located between the first mirror and the second mirror, and the distance from the last imaging element to the image plane can not be taken larger than the f value of an fθ mirror.

Further, JP-A Nos. 2001-13441 and 2001-13442 discloses a device using one mirror, and, in this case, a principal point is located on the mirror surface. Accordingly, the distance from the last mirror surface to the image plane becomes nearly equal to the value of the f value of the fθ mirror.

Further, there is a device using a pair of plastic lenses as one employing optical elements using inexpensive molded components, and there is a restriction that large powers can not be provided to the lenses themselves in order to suppress the influences of temperature and humidity to the refractive indexes and shapes. On this account, it has been necessary to make an effective field angle smaller and raise image frequencies in order to secure the distance between the last imaging element and the image plane. If aluminum evaporation is performed on the molded component for use as a mirror, the influences of temperature and humidity to the refractive indexes can be removed. In the past, there has been a device in which the first mirror is formed in a concave shape having a positive power, however, the image side principal point becomes nearer the rotating polygon mirror side than the second mirror, and the distance between the last imaging element and the image plane becomes shorter.

In order not to be affected by irregularities in faces of the rotating polygon mirror (amounts of variation in the case where the distance from the rotational center to the reflection surface differ from face to face), it is considered that a beam nearly paralleled to the main scanning direction enters the rotating polygon mirror (see FIG. 1). In this case, the f value of fθ characteristic becomes nearly equal to the combined focal length in the imaging system. Accordingly, the location at the combined focal length from the image plane side principal point becomes an image plane.

As one method for securing the distance between the last imaging element and the image plane, there is a method of making the f value larger. However, this makes the θ0 value smaller when scanning the same width. In this case, there are following two drawbacks.

(1) When the θ value becomes smaller, the image frequency as a frequency of laser ON/OFF corresponding to one pixel is raised.

The beam position is designed so that the relationship h=fθ is satisfied. Assuming that the size of one pixel is Δh and the deflection angle when one pixel is formed is Δθ, Δh=fΔθ holds. The equation is expressed by Δh=fωΔT where the deflection angular velocity of the beam is ω and the time for forming one pixel is ΔT. Accordingly, the image frequency is expressed by 1/ΔT=fω/Δh. This shows that the image frequency is proportional to f, and, as f is made larger, the image frequency is also raised.

(2) Since, as the smaller the θ value, the distance from the reflection surface of the rotating polygon mirror to the last surface of the imaging element also becomes larger in proportion to f, the entire optical path length becomes longer and the unit becomes upsized.

As another method, there is a method of making the image side principal point in the main scanning direction nearer the image plane side than the last imaging element.

The case where two optical elements having powers $\phi_1$ and $\phi_2$ are located at distance $d_2$ is considered using paraxial ray theory.

The combined power is $$\phi_t = \phi_1 + \phi_2 - d_2 \times \phi_1 \times \phi_2 \tag{1}$$

The object point side principal point position is expressed from the first optical element by:

$$\Delta_1 = d_2(\phi_2/\phi_t) \tag{2}$$

The image plane side principal point position is expressed from the second optical element by:

$$\Delta_2 = -d_2(\phi_1/\phi_t) \tag{3}$$

where $\Delta_1$ and $\Delta_2$ are positive at the image plane side.

Here, in the main scanning direction, it is necessary to set the combined power $\phi_t$ positive so that a nearly parallel beam enters the optical element and is imaged on the image plane.

To make the image plane side principal point position nearer the image plane side than the second optical element, the power allocation may be made so that $\Delta_2 > 0$ holds.

Since the distance between elements is positive, $d_2 > 0$ holds. As described above, since the combined power is positive, $\phi_t > 0$ holds. From the above conditions and (Eq3), if $\phi_1 < 0$, $\Delta_2 > 0$ can be realized.

Furthermore, to make the combined power positive, the following condition is required. First, rewrite (Eq1) and the condition is expressed by:

$$\phi_t = \phi_2 + \phi_2(1 - d_2 \times \phi_1)$$

Since $d_2 > 0$ and $\phi_1 < 0$, and $(1 - d_2 \times \phi_1) > 0$ and 4) <0, it is necessary that at least $\phi_2 > 0$ so that $\phi_t > 0$ holds. To be precise, it is necessary that $\phi_2 > -[\phi_1/(1 - d_2 \times \phi_1)]$ holds.

Therefore, in an optical system including a pair of optical elements, when the optical element at the object point side is formed by an optical element having a negative power and the optical element at the image plane side is formed by an optical element having a positive power, the image side principal point can be made nearer the image plane side than the image plane side optical element (see FIG. 3).

For the purpose of achromatization of axial aberration, the configuration with a pair of lenses in which the power of the lens at the deflector side is made negative and the material of the lens at the deflector side is made to have high refractive index and high dispersion property has been developed. The purpose is in achromatization as a problem specific to lenses. On the other hand, there is no change in power due to wavelength in a mirror and there is no problem of achromatization specific to lenses. Accordingly, for mirrors, examination on power allocation as above lenses has not been made.

SUMMARY OF THE INVENTION

An optical beam scanning device includes a rotating polygon mirror for scanning a beam from a pre-deflection optical system in a main scanning direction and two mirrors for imaging the beam scanned by the rotating polygon mirror on an image plane, and a first mirror at the rotating polygon mirror side has a negative power in the main scanning direction and a second mirror at the image plane side has a positive power in the main scanning direction. Thereby, the degrees of freedom of shape and arrangement of process unit or the like can be made higher and the optical beam scanning device, an exposure apparatus and an image forming apparatus incorporating the optical beam scanning device can be downsized by securing the distance between the last imaging element and the image plane while suppressing the increase in the optical path length between the reflection surface of the rotating polygon mirror and the image plane.

DETAILED DESCRIPTION OF THE INVENTION

Figure 1:
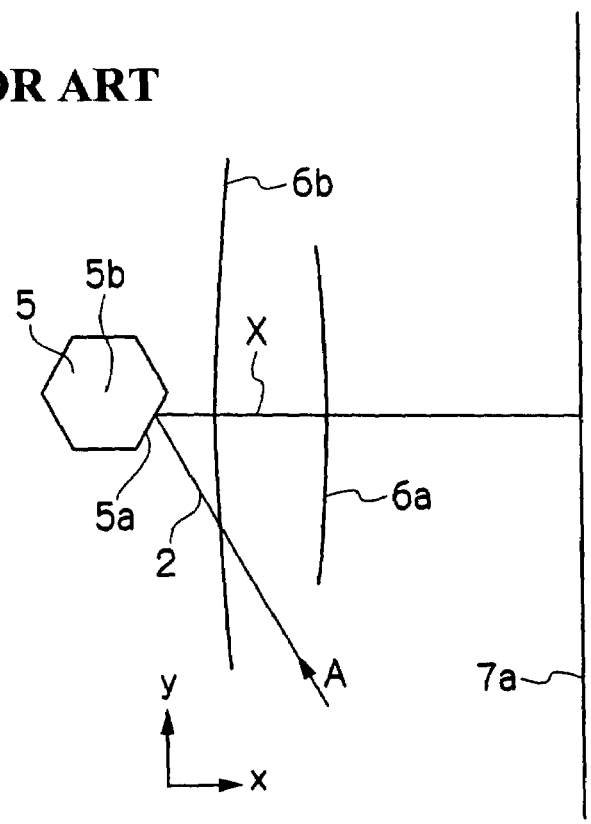
FIG. 1 is a plan view showing a conventional post-deflection optical system using two mirrors.

Hereinafter, preferred embodiments of an exposure apparatus including an optical beam scanning device according to the invention will be described.

First Embodiment

An exposure apparatus incorporating an optical beam scanning device according to the embodiment includes a rotating polygon mirror for scanning a beam from a pre-deflection optical system in a main scanning direction, and two mirrors (a first mirror at the rotating polygon mirror side and a second mirror at an image plane side) for imaging the beam scanned by the rotating polygon mirror on the image plane. A specific example of the exposure apparatus will be described in detail in a specific example. In the exposure apparatus, the first mirror at the rotating polygon mirror side has a negative power in the main scanning direction and the second mirror at the image plane has a positive power in the main scanning direction. According to the configuration, in the scanning optical system with mirrors, the degrees of freedom of shape and arrangement of process unit or the like can be made higher, and the exposure apparatus and an image forming apparatus incorporating the exposure apparatus can be downsized by securing the distance between the last imaging element and the image plane while suppressing the increase in T.T. (optical path length between the reflection surface of the rotating polygon mirror and the image plane). As below, the configuration will be specifically described.

Study has been made on whether or not the configuration in which the main scanning direction principal point position is made nearer the image plane side can be realized while satisfying fθ characteristic, curve of scanning line, face tilt correction function, and imaging characteristics as characteristics required for the scanning optical system by making the power of the mirror at the deflector (rotating polygon mirror) side in the main scanning direction negative and the power of the mirror at the image plane side in the main scanning direction positive in the pair of mirrors.

In the case of lenses, there are degrees of freedom of design in incident surface shape, exiting surface shape, thickness, refractive index, dispersion for each one lens, and the power allocation in the main scanning direction can be made into a negative power at the deflector side and a positive power at the image plane side by optimizing these degrees. Further, since the exiting light exits from the opposite side of the optical element to the incident light, no problem occurs even when the lens axis is not inclined relative to the beam with respect to the sub-scanning direction.

Contrary, in mirrors, there are the following restrictions.

(1) The surface shape of only one surface can be controlled with respect to each mirror. The number of surfaces the shapes of which can be controlled is reduced by one surface for one optical element, and thickness, refractive index, or dispersion can not be controlled, either.

(2) In the case of mirrors, compared to the optical elements, the exiting light is output toward the same side as that of the incident light. Accordingly, the mirror surfaces are required to be inclined toward the sub-scanning direction so that the following conditions are satisfied:

i) the optical path at the upstream side of the first mirror is not blocked by the second mirror; and ii) the optical path at the downstream side of the second mirror is not blocked by the first mirror.

It becomes clear as a result of the study that, under such restrictions, in the configuration with a pair of mirrors, when the object point side in the main scanning direction is formed by an optical element having a negative power and the image plane side is formed by an optical element having a positive power, characteristics required for the scanning optical system can be realized. That is, imaging elements are formed by a pair of mirrors and the first mirror is made to have a negative power and the second mirror is made to have a positive power with respect to the main scanning direction, and thereby, the following effect can be obtained.

Figure 4:
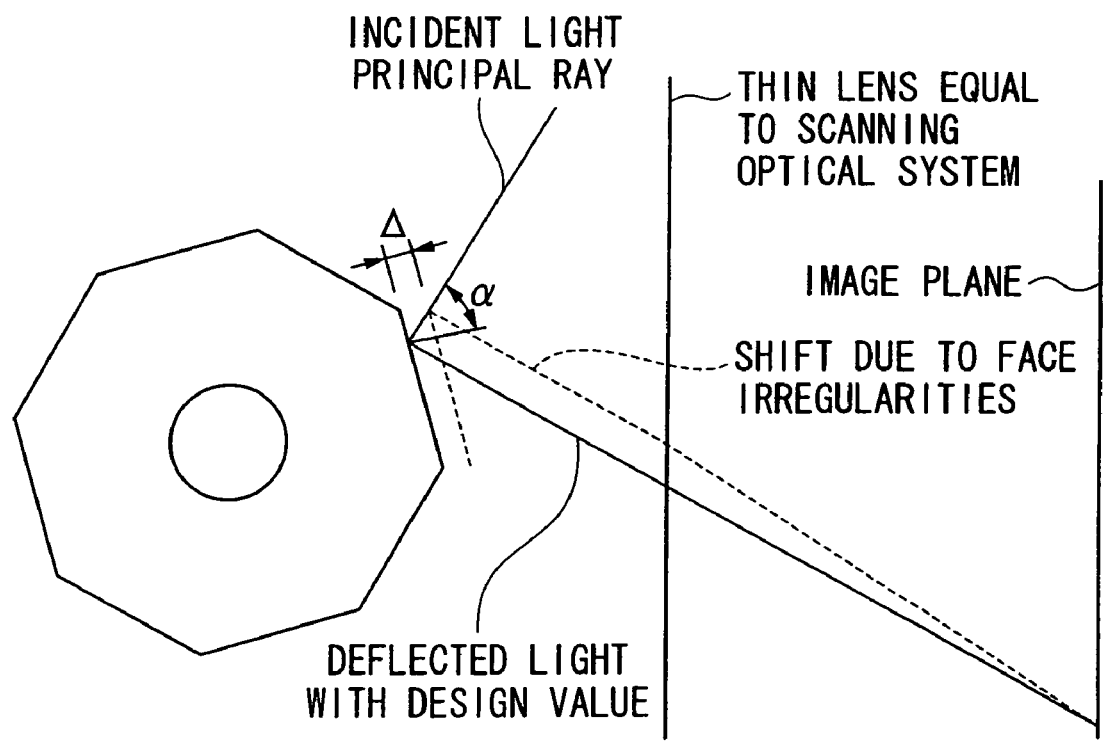
FIG. 4 is a schematic plan view showing a state of a beam from a rotating polygon mirror of a deflector to an image plane in the case where there are face irregularities.

In order not to be affected by face irregularities of the rotating polygon mirror (amounts of variation in the case where the distance from the rotational center to the reflection surface differ from face to face), it is considered that a nearly paralleled beam to the main scanning direction enters the rotating polygon mirror (see FIG. 4). In this case, the f value of fθ characteristic becomes nearly equal to the combined focal length in the imaging system. Accordingly, the location at the combined focal length from the image plane side principal point becomes an image plane.

Figure 3:
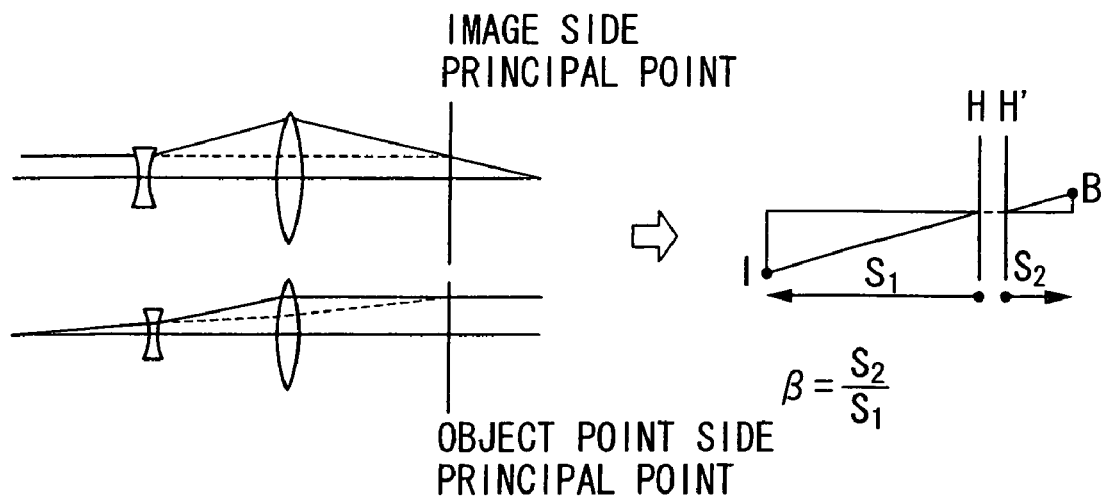
FIG. 3 is a schematic diagram for explanation of a position of a principal point.

The first mirror is made to have a negative power and the second mirror is made to have a positive power with respect to the main scanning direction, and thereby, the image side principal point in the main scanning direction is made nearer the image plane than the final imaging element. As shown in FIG. 3, since the image side principal point is shifted nearer the image plane side than the second mirror as the second optical element, the distance between the second mirror and the image plane can be kept longer.

Thereby, the degrees of freedom of shape and arrangement of process unit or the like can be made higher and downsizing of the optical beam scanning device, and an exposure apparatus and an image forming apparatus incorporating the device can be realized by securing the distance between the second mirror and the image plane while suppressing the increase in the optical path length between the reflection surface of the rotating polygon mirror and the image plane.

Second Embodiment

An exposure apparatus incorporating an optical beam scanning device according to the embodiment is limited in requirement of each mirror in the sub-scanning direction in addition to the above described first embodiment.

In the exposure apparatus according to the embodiment, in each mirror of the above described first embodiment, the first mirror is formed to have a negative power in the sub-scanning direction and the second mirror is formed to have a positive power in the sub-scanning direction, and the image plane side principal point is located nearer the image plane than the second mirror both in the main scanning direction and the sub-scanning direction.

When a beam is diagonally entered into the rotating polygon mirror, including both cases of design and manufacturing tolerance, the influence by the face irregularities of the rotating polygon mirror appears as displacement of scanning lines in the sub-scanning direction. With respect to the sub-scanning direction, in order to correct the influence of face tilt of the rotating polygon mirror, the reflection point of the rotating polygon mirror and the image plane a reset in a conjugate relationship. The influence by the face irregularities first appears in the displacement of the reflection point due to the face irregularities. Further, it is conceivable that, when the beam diagonally enters, the displacement in the sub-scanning direction position occurs on the rotating polygon mirror due to the displacement of the reflection point, and this is enlarged (reduced) by an image optical system by magnification in the sub-scanning direction, and projected onto the image plane. On this account, the absolute value of the magnification in the sub-scanning direction is desirably made smaller, however, for this purpose, it is necessary to make the position of the image side principal point nearer the image plane.

On the other hand, from the same point of view as for the main scanning direction, the optical elements are desirably located in the position distant from the image plane.

Thus, also in the sub-scanning direction, the relationship between the first mirror having a negative power and the second mirror having a positive power is kept, and thereby, the distance between the second mirror and the image plane can be kept while obtaining desirable characteristics in the main scan and sub-scanning directions.

Third Embodiment

An exposure apparatus incorporating an optical beam scanning device according to the embodiment is further limited in requirement of each mirror in the sub-scanning direction in the above described second embodiment.

In the exposure apparatus according to the embodiment, in each mirror of the above described second embodiment, the absolute value of the sub-scanning direction power of the first mirror is set larger than the absolute value of the sub-scanning direction power of the second mirror.

Thus, the absolute value of the sub-scanning direction power of the first mirror is made larger than the absolute value of the sub-scanning direction power of the second mirror, and thereby, the image plane side principal point position can be made much nearer the image plane.

The specific configuration is as follows. From (Eq3'), which will be described later, to make the image plane side principal point position nearer the image plane than the second lens surface, $\phi'_1$ is negative and the larger the absolute value, the better. On the other hand, to provide the face tilt correction function, it is necessary to set the reflection surface of the rotating polygon mirror and the image plane in a conjugate relationship, and, for this purpose, the combined power $\phi'_t$ is required to be positive. Typically, $\phi'_1 + \phi'_2$ on the right side of (Eq1') is set positive, however, here, $\phi'_1 + \phi'_2$ is set negative, and $-d_2 \times \phi'_1 \times \phi'_2$ is set positive and $d_2$ is set larger to make $|\phi'_1 + \phi'_2| < |-d_2 \times \phi'_1 \times \phi'_2|$, and thereby, it is confirmed that even the configuration with positive combined power can sufficiently satisfy the performance as the scanning optical system.

Fourth Embodiment

An exposure apparatus incorporating an optical beam scanning device according to the embodiment is further limited in requirement of each mirror in the sub-scanning direction in the above described respective embodiments.

In the exposure apparatus according to the embodiment, in two mirrors of the post-deflection optical system, curvatures in the main scanning direction and the sub-scanning direction are changed according to the respective positions in the main scanning direction and the sub-scanning direction, which are asymmetric in the sub-scanning direction.

By the two mirrors of the post-deflection optical system, preferable fθ characteristic, curve of scanning line, face tilt characteristic can be obtained.

Fifth Embodiment

An exposure apparatus according to the embodiment is further limited in requirement of linear expansion coefficient of a base material of each mirror in the above described respective embodiments.

In the exposure apparatus according to the embodiment, the linear expansion coefficient of the base material of the mirror at the rotating polygon mirror side is set larger than the linear expansion coefficient of the base material of the mirror at the image plane side.

Thereby, assuming the powers of single elements at predetermined temperature are $\phi_{10}$ and $\phi_{20}$, and the powers of single mirrors when the temperature changes from the predetermined temperature by $\Delta t$ degrees are $\phi_1$ and $\phi_2$, the following equations-hold, respectively, because the mirror surfaces change due to thermal expansion.

$$\phi_1 = \phi_{10}/(1 + \alpha_1 \times \Delta t)$$

$$\phi_2 = \phi_{20}/(1 + \alpha_2 \times \Delta t)$$

Where $\alpha_1$ is a linear expansion coefficient of the base material of the first mirror and $\alpha_2$ is a linear expansion coefficient of the base material of the second mirror.

On the other hand, the combined principal point position of the two optical elements is expressed by the above described (Eq2) and (Eq3).

Assuming that the distance between the reflection point and the first mirror is $d_1$ and the distance between the second mirror and the image plane is $d_3$, the distance from the combined image side principal point of the optical elements to the image plane is:

$$d_3 - \Delta_2$$

First, the main scanning direction will be considered.

When a nearly parallel beam is entered into the post-deflection optical system, because the imaging position is located distant from the principal point by the combined focal length $f_t$, to keep the image plane position fixed regardless of temperature change, it is necessary that $$f_t - (d_3 - \Delta_2) = 1/\phi_t - (d_3 - \Delta_2) \quad (4)$$

is not a function of temperature.

Accordingly, the value obtained by differentiating (Eq4) by the amount of temperature change $\Delta t$ desirably becomes 0.

$$d(1/\phi_t - (d_2 - \Delta_2))/d(\Delta t) = 0 \quad (5)$$

Here, assuming that the linear expansion coefficients d1, d2, and d3 are sufficiently smaller than the expansion rate of the base material of the mirror and not functions of temperature, when (Eq5) is solved with respect to $\alpha_1$, $$\alpha_1 = -\alpha_2 (-1 + d_2 \phi_{10})^2 \phi_{20}/\phi_{10} \quad (6)$$

is obtained. Since, if $\phi_{10}$ is negative in (Eq6), $d_2 \phi_{10}$ also becomes negative, $$(-1 + d_2 \phi_{10})^2 > 1$$

Further, in the range discussed here, a solution is obtained in a range where the absolute value of the power of the second mirror is larger than the absolute value of the power of the first mirror with respect to the main scanning direction. Accordingly, $$-\phi_{20}/\phi_{10} > 1$$

Since, if these two values, namely, values larger than 1 are multiplied, a value larger than 1 is obtained, it is known from (Eq6) that $$\alpha_1 > \alpha_2$$

is desirable.

Next, the sub-scanning direction will be considered.

The following $\phi'_{10}$ and $\phi'_{20}$ express powers at predetermined temperature in the sub-scanning direction, and, when values different from values in the main-scanning direction are discriminated by attaching "'" thereto.

$$\phi'_1 = \phi'_{10}/(1 + \alpha_1 \times \Delta t)$$

$$\phi'_2 = \phi'_{20}/(1 + \alpha_2 \times \Delta t)$$

The combined power is expressed by the following equation.

$$\phi'_t = \phi'_1 + \phi'_2 - d_2 \times \phi'_1 \times \phi'_2 \quad (1')$$

According to the imaging system of lenses, assuming that the optical path length between the object point and the combined object point side principal point is $S'_1$, the distance between the combined image plane side principal point and the image plane is $S'_2$, the distance between the first mirror surface and the combined object point side principal point is $\Delta'_1$, and the distance between the second mirror surface and the combined image side principal point is $\Delta'_2$, $$\Delta'_1 = d_2(\phi'_2/\phi'_t) \quad (2')$$

$$\Delta'_2 = -d_2(\phi'_1/\phi'_t) \quad (3')$$

$$S' = d_1 + \Delta'_1$$

From the paraxial imaging formula of optical element, $$1/S'_1 + 1/S'_2 = \phi'_t$$

When this is solved with respect to $S'_2$, the imaging position is expressed by $$S'_2 = -S'_1/(1 - \phi'_t S'_1) \quad (7)$$

On the other hand, the distance between the image side principal point position and the image plane is expressed by $$d_3 - \Delta'_2 \quad (8)$$

The difference between (Eq7) and (Eq8) is an amount of displacement of imaging point. This is differentiated by the amount of temperature change $\Delta t$, and, when the value becomes 0, the influence by the temperature change does not appear.

That is, $$d[(d_3 - \Delta'_2) - S'_2]/d[\Delta t] = 0$$

When this is solved with respect to $\alpha_1$, $$\alpha_1 = -\alpha_2(-d_2 - d_1 + d_2 d_1 \phi'_{10})^2 \phi'_{20}/(d_1^2 \phi'_{10}) \quad (9)$$

is obtained.

In this power allocation with characteristics, $-(-d_3-d_1+d_2d_1\phi'_{10})^2\phi'_{20}/(d_1{}^2\phi'_{10})>1$ holds, and, in this case, $\alpha_1>\alpha_2$ is also obtained. That is, it is desirable that the linear expansion coefficient of the base material of the first mirror is larger than the linear expansion coefficient of the base material of the second mirror.

Sixth Embodiment

An exposure apparatus according to the embodiment is limited in specific structure of each mirror in the above described respective embodiments.

In the exposure apparatus according to the embodiment, the first mirror at the rotating polygon mirror side has a negative power in the main scanning direction and the second mirror at the image plane has a positive power in the main scanning direction. Specifically, the imaging elements are formed by two mirrors, and the first mirror having a negative power in the main scanning direction has a convex shape in the main scanning direction, and the second mirror having a positive power in the main scanning direction has a concave shape in the main scanning direction. Furthermore, the first mirror has a convex shape in the sub-scanning direction and the second mirror has a concave shape in the sub-scanning direction. Thereby, the image side principal point is located nearer the image plane side than the second mirror in both main scan and sub-scanning directions.

The absolute value of the curvature of the first mirror in the sub-scanning direction is set larger than the absolute value of the curvature of the second mirror in the sub-scanning direction. Further, each mirror has a free curved surface asymmetric in the sub-scanning direction. The linear expansion coefficient of the base material of the first mirror at the rotating polygon mirror is set larger than the linear expansion coefficient of the base material of the second mirror at the image plane.

By the structure, the same effect as that of each embodiment is exerted.

Seventh Embodiment

An exposure apparatus incorporating an optical beam scanning device according to the embodiment is limited in specific arrangement structure of each mirror in the above described respective embodiments.

Figure 5:
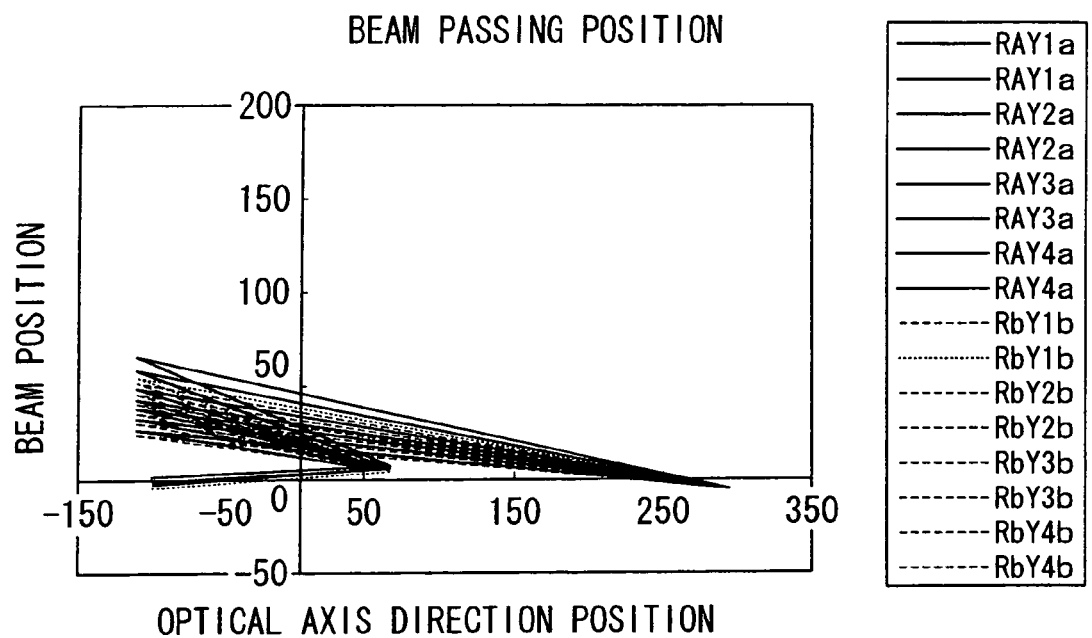
FIG. 5 is a schematic diagram showing a position where a beam passes through in a sub-scanning direction.

In the exposure apparatus according to the embodiment, as shown in FIG. 5, the first mirror is displaced in a predetermined direction (upward in FIG. 5) with respect to the sub-scanning direction relative to the rotating polygon mirror, and the second mirror is displaced in the same direction as the predetermined direction (upward in FIG. 5) relative to the first mirror. At this time, when the sub-scanning direction section in a state in which the folds after reflection by the two mirrors are developed is seen, the beam passes in the predetermined direction (upward in FIG. 5) seen from the first mirror.

That is, in FIG. 5, the apparatus is configured so that the first mirror is displaced upwardly in the sub-scanning direction than the rotating polygon mirror and the second mirror is displaced upwardly in the sub-scanning direction than the first mirror, and further, the beam reflected by the second mirror is displaced upwardly in the sub-scanning direction than the first mirror.

Thereby, when the first and second mirrors are used, the limitation of arrangement positions is reduced, and the degree of freedom of optical path design can be raised.

Conventional examples of the optical path design are disclosed in JP-A Nos. 2001-56445 and 2000-275557.

Figure 2:
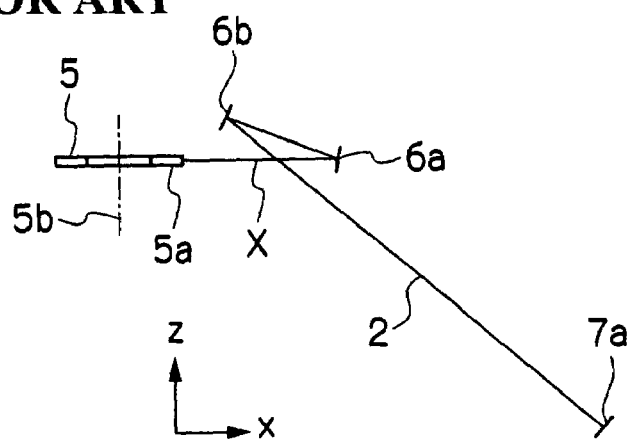
FIG. 2 is a side view showing the conventional post-deflection optical system using two mirrors.

In JP-A No. 2001-56445, two mirrors are used, and the rotating polygon mirror and the first mirror are nearly at the same height and the second mirror is displaced in a predetermined direction. The beam reflected by the second mirror passes at the opposite side (lower side in FIG. 2) to the predetermined direction relative to the first mirror.

As shown in JP-A Nos. 2001-56445 and 2000-275557, if the optical path after reflection by the second mirror is arranged so as to pass between the reflection surface of the rotating polygon mirror and the first mirror, there are the following restrictions.

a) With respect to the optical axis direction, the second mirror is required to be located between the rotating polygon mirror and the first mirror.

b) The reflected light from the second mirror is required to form a large angle relative to the scanning line between the rotating polygon mirror and the first mirror.

Figure 6:
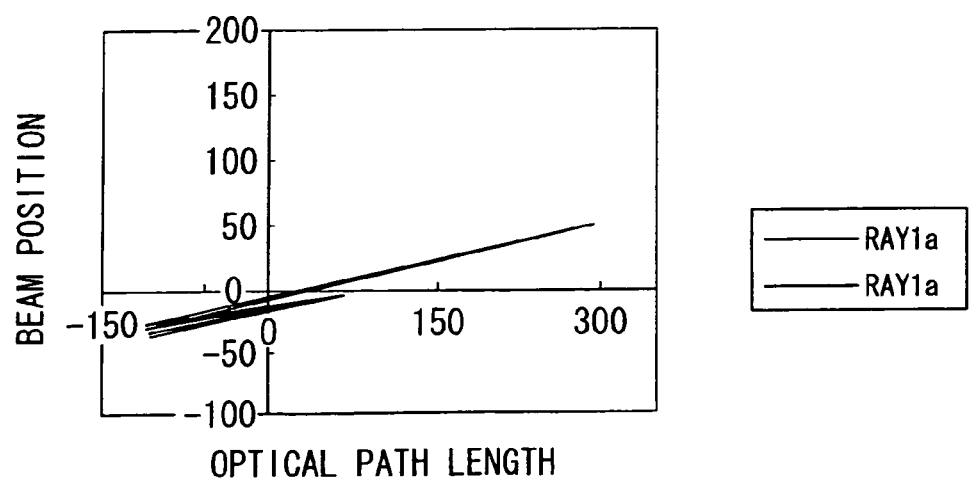
FIG. 6 is a schematic diagram showing a relationship between beam position and optical path length.

If the f$\theta$ characteristic, face tilt characteristic, curve of scanning line, and focusing property are optimized without the restriction of a), [(optical path length from the rotating polygon mirror to the first mirror)<(optical path length from the first mirror to the second mirror)] holds. When the reflection light from the second mirror is passed between the rotating polygon mirror and the first mirror, the beam collides against the rotating polygon mirror or the first mirror as shown in FIG. 6.

Figure 7:
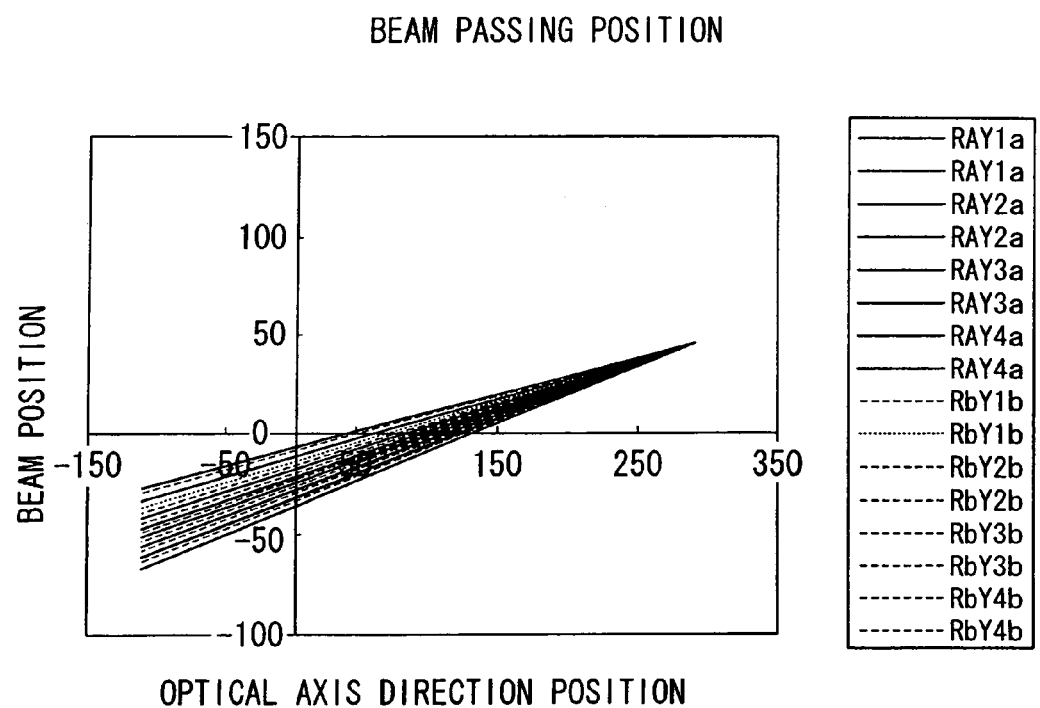
FIG. 7 is a schematic diagram showing relationships between beam positions and optical axis direction positions.

Furthermore, considering that a large number of beams are passed through, as shown in FIG. 7, a restriction arises on passing all beams between the rotating polygon mirror and the first mirror.

From the restriction of b), when the second mirror having a power in the main scanning direction is largely inclined relative to the incident beam, the larger the inclination angle, the larger the curve of the scanning line produced by the second mirror becomes. For correcting this, the entire shape in the main scanning direction and the aspheric surface shape in the sub-scanning direction are greatly restricted, and optimization of other abilities, f$\theta$ characteristic, face tilt characteristic, curve of scanning line, and focusing property in the sub-scanning direction becomes difficult.

Further, conventionally, a beam intersects with the sub-scanning direction, that is, an optical path has been taken in which the beam is output perpendicularly to the polygon mirror face of the rotating polygon mirror, reflected and inclined by the first mirror in a predetermined direction, then reflected by the second mirror, and thereby, the reflection light from the second mirror intersects with the scanning line between the rotating polygon mirror and the first mirror.

In this system, seen in a plan view, the position of the second mirror has been desirably located between the rotating polygon mirror and the first mirror. Accordingly, since it has been necessary to hold [(optical path length from the rotating polygon mirror to the first mirror)>(optical path length from the first mirror to the second mirror)] and take the folding angle by the first mirror larger, there has been need to adopt an optimum configuration within the range.

Contrary, the exposure apparatus according to the embodiment adopts the following configuration.

An optical path is taken, with respect to the sub-scanning direction, in which the beam is output diagonally to the polygon mirror face of the rotating polygon mirror, reflected and inclined by the first mirror in a predetermined direction, and thereby, the reflection light from the second mirror does not intersect with the scanning line between the rotating polygon mirror and the first mirror.

In this system, the restriction on the position of the second mirror is reduced, and [(optical path length from the rotating polygon mirror to the first mirror)<(optical path length from the first mirror to the second mirror)] can hold, there is no longer need to take the folding angle by the first mirror larger.

A specific configuration is as follows.

The incident point of the principal ray to each mirror is set as an origin, and a right-hand local coordinate system is adopted. X-direction is parallel with the direction of the incident light and the direction same as the advancing direction of the beam is switched between negative and positive with respect to each reflection. In the local coordinate system, the direction from X-axis toward Z-axis is positive of the angle.

Further, Y-direction is parallel with the direction in which a predetermined beam is scanned and the same direction with respect to all beams. In this regard, an optical path in which the sine of the normal angle of the mirror surface seen from X-axis takes the same sign is adopted.

Thereby, restrictions in arrangement of the first mirror and the second mirror are alleviated and restrictions of the entire shape in the main scanning direction and the sectional shape in the sub-scanning direction are alleviated, and therefore, the fθ characteristic, focusing property, face tilt characteristic, and focusing property in the sub-scanning direction can be improved.

Eighth Embodiment

An exposure apparatus incorporating an optical beam scanning device according to the embodiment is limited in specific arrangement structure of each mirror in the above described respective embodiments. The exposure apparatus according to the embodiment is configured by combining the first embodiment and the seventh embodiment.

According to the configuration, effects of the respective embodiments can be provided. Further, in this combination, when the mirror normal is at an angle relative to the incident light and the imaging elements are arranged so as not to interrupt the optical path, the scanning line curve produced by providing the power in the main-scanning direction and making it diagonal can be suppressed by the effect of the arrangement itself. Thereby, the effect by aspherization is focused on the imaging characteristics, face tilt correction characteristics, or the like and can be improved.

Further, as described in the third embodiment, in order to make it enable to take $d_2$ larger, the image side principal point position in the sub-scanning direction can be brought much nearer the image plane side. Therefore, the lateral magnification β in the sub-scanning direction can be suppressed. Thus, this can be effective to the twelfth embodiment and thirteenth embodiment, which will be described later.

Next, in order to obtain mirror arrangement for suppressing the curve of scanning line, a mirror having a curvature in the main scanning direction and no curvature in the sub-scanning direction is assumed, and a condition under which no displacement of scanning line is produced is obtained.

Figure 8:
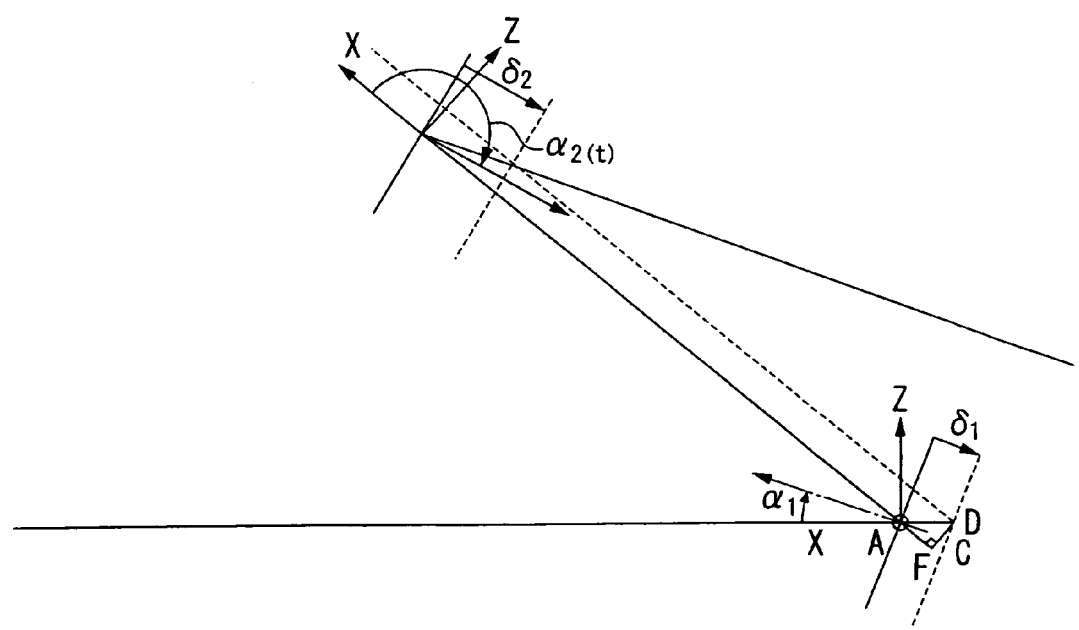
FIG. 8 is a schematic diagram showing an optical path of a beam reflected by a first mirror and a second mirror.

FIG. 8 shows projection of a mirror and a principal ray of an optical path on a plane in the sub-scanning sectional direction when the curvature in the sub-scanning direction of the mirror in the post-deflection optical system is made 0. The state of the central part in the scanning direction is shown by solid lines and the state of both ends is shown by broken lines, and the amount of curve of the scanning line will be discussed. The incident point of the principal ray to each mirror is set as an origin, and a right-hand local coordinate system is adopted. X-direction is parallel with the direction of the incident light and the direction same as the advancing direction of the beam is switched between negative and positive with respect to each reflection. In the drawing, in the local coordinate system, the direction from X-axis toward Z-axis is positive of the angle. Further, Y-direction is set parallel with the direction in which a predetermined beam is scanned and the same direction with respect to all beams.

When the incident angle to the first mirror is $\alpha_1$ and the mirror is displaced in the perpendicular direction to the mirror reflection surface by $\delta_1$ (negative in the direction displaced in the incident light side and positive in the direction displaced oppositely to the incident light), the amount of displacement of the principal ray at between the central part and both ends of the reflection light can be obtained as follows.

$$\angle FAD = 2\alpha_1$$

The amount of displacement of the beams in the perpendicular direction relative to the principal ray at the central part and both ends of the reflection light is:

$$DF = \delta_1/\cos(\angle DAC) \times \sin(\angle FAD) = \delta_1/\cos(\alpha_1) \times \sin(2\alpha_1) = 2\delta_1 \sin(\alpha_1) \quad (10)$$

Since this amount is preserved without change after the beam is folded by other mirrors, the amount of displacement of the light incident to the scanned surface is obtained by adding all amounts of displacement produced by other mirrors.

In the case of two mirrors as shown in FIG. 8, mirror normal directions relative to X-axis in the right-hand local coordinate system seen from the incident light are $\alpha_1$ and $\alpha_2$, respectively, if the amounts of displacement between linear lines connecting both ends of regions that the beams of the respective mirrors pass through and the central part are $\delta_1$ and $\delta_2$, the amount of displacement of the exiting light position is:

$$2(\delta_1 \times \sin(\alpha_1) + \delta_2 \times \sin(\alpha_2)) \quad (11)$$

Assuming the radius of curvature of the mirror in the main-scanning direction is r (here, r takes a positive sign when the mirror surface is convex and a negative sign when the mirror is concave), and the width in the scanning direction of the region in which the beam is scanned on the mirror is ι, the relationship:

$$\delta = r \times (1 - \cos(\arctan(\iota/2/r))) \approx 1/2/r \times (\iota/2)^2 \quad (12)$$

holds with amount of displacement δ between the linear lines connecting both ends of regions that the beams of the respective mirrors pass through and the central part.

Since $\delta \approx 1/2/r \times (\iota/2)^2$ from (Eq12), (Eq11) is:

$$1/4 \times (\iota_1^2/r_1 \times \sin(\alpha_1) + \iota_2^2/r_2 \times \sin(\alpha_2)) \quad (13)$$

If it becomes nearly zero, the beams output from the pair of mirrors can be superimposed. That is, the following (Eq14) is a condition equation for superimposing the beams output from the pair of mirrors.

$$1/4 \times (L_1^2/r_1 \times \sin(\alpha_1) + L_2^2/r_2 \times \sin(\alpha_2)) = 0 \quad (14)$$

This is solved with respect to $\alpha_2$, and the condition is expressed by $$\sin(\alpha_2) = -\iota_1{}^2/\iota_2{}^2 \times r_2/r_1 \times \sin(\alpha_1) \quad (15)$$

Here, $r_1$ is convex and positive, and $r_2$ is concave and negative. Accordingly, it is known that $-\iota_1{}^2/\iota_2{}^2 \times r_2/r_1$ in (Eq15) becomes positive, and the signs of $\sin(\alpha_2)$ and $\sin(\alpha_1)$ become the same.

This expresses the relationship as in the drawing. That is, the system is formed by a pair of fθ mirrors, the first mirror is displaced in a predetermined direction (upward in FIG. 8) with respect to the sub-scanning direction relative to the rotating polygon mirror, and the second mirror is displaced in the same direction as the predetermined direction (upward in FIG. 8) relative to the first mirror. That means, when the sub-scanning direction in a state in which the folds after reflection by the two mirrors are developed is seen, the beam passes in the predetermined direction (upward in FIG. 8) seen from the first mirror.

By the arrangement, since there is no longer need to change the normal direction of the pair of mirrors in the sub-scanning direction only for correcting the curve bow of the scanning line, the sub-scanning direction shape can be determined in each main scanning direction position according to the imaging characteristics, face tilt correction characteristics, or the like, and these characteristics can be improved.

Ninth Embodiment

An exposure apparatus according to the embodiment is configured by combining the sixth embodiment and the seventh embodiment.

In the exposure apparatus according to the embodiment, the imaging elements are formed by two mirrors, and the first mirror having a negative power in the main scanning direction has a convex shape in the main scanning direction, and the second mirror having a positive power in the main scanning direction has a concave shape in the main scanning direction. Furthermore, the first mirror has a convex shape in the sub-scanning direction and the second mirror has a concave shape in the sub-scanning direction. Thereby, the image side principal point is located nearer the image plane side than the second mirror in both main scan and sub-scanning directions.

Further, the absolute value of the curvature of the first mirror in the sub-scanning direction is set larger than the absolute value of the curvature of the second mirror in the sub-scanning direction. Further, each mirror has a free curved surface asymmetric in the sub-scanning direction. The linear expansion coefficient of the base material of the first mirror at the rotating polygon mirror side is set larger than the linear expansion coefficient of the base material of the second mirror at the image plane side.

Furthermore, the respective members are arranged so that the first mirror is displaced upwardly in the sub-scanning direction than the rotating polygon mirror, the second mirror is displaced upwardly than the first mirror, and further, the beam reflected by the second mirror is displaced upwardly in the sub-scanning direction than that by the first mirror.

By the structure, the same effect as that of each embodiment is exerted.

Tenth Embodiment

In an exposure apparatus incorporating an optical beam scanning device according to the embodiment, the influence by linear expansion is suppressed to the minimum. That is, when two or more mirrors are used, even if a mirror using a resin having a large linear expansion coefficient as a base material and evaporated with aluminum is used, change in characteristics due to temperature change can be suppressed.

In imaging elements for scanning optical system formed by two mirrors, assuming that the respective base materials are different, and linear expansion coefficients are (x and $\alpha_2$, the respective powers in the main scanning direction are $\phi_{10}$ and $\phi_{20}$, and the respective powers in the sub-scanning direction are $\phi'_{10}$ and $\phi'_{20}$, the optical path length between the two mirrors is $d_2$, and the optical path length between the reflection point of the deflector and the first mirror is $d_1$, if $|\alpha_2 - \alpha_{1i}| > |\alpha_1 - \alpha_{1i}|$ and $|\alpha_2 - \alpha'_{1i}| > |\alpha_1 - \alpha'_{1i}|$ Here, $\alpha_{1i}$ is a value of (Eq6) and $\alpha'_{1i}$ is a value of (Eq9), if $\alpha_{1i} = -\alpha_2(-1 + d_2\phi_{10})^2 \phi_{20}/\phi_{10}$ $\alpha'_{1i} = -\alpha_2(-d_2 - d_1 + d_2 d_1 \phi'_{10})^2 \phi_{20}/(d_1{}^2 \phi'_{10})$ occurrence of defocus due to temperature change can be suppressed more than using a common base material.

Conventionally, since mirrors are created by a single base material, there has been a need to select materials having linear expansion coefficients as small as possible for both mirrors.

Contrary, in the embodiment, the optimal combination is selected not by minimizing the absolute values of linear expansion coefficients.

In the imaging elements for scanning optical system formed by two mirrors, assuming that the respective base materials are different, and linear expansion coefficients are $\alpha_1$ and $\alpha_2$, the respective powers in the main scanning direction are $\phi_{10}$ and $\phi_{20}$, and the respective powers in the sub-scanning direction are $\phi'_{10}$ and $\phi'_{20}$, the optical path length between the two mirrors is $d_2$, and the optical path length between the reflection point of the deflector and the first mirror is $d_1$, $|\alpha_2 - \alpha_{1i}| > |\alpha_1 - \alpha_{1i}|$ and $|\alpha_2 - \alpha'_{1i}| > |\alpha_1 - \alpha'_{1i}|$.

Here, $\alpha_{1i} = -\alpha_2(-1 + d_2\phi_{10})^2 \phi_{20}/\phi_{10}$ $\alpha'_{1i} = -\alpha_2(-d_2 - d_1 + d_2 d_1 \phi'_{10})^2 \phi_{20}/(d_1{}^2 \phi'_{10})$ The condition under which the imaging position is not varied in the main scanning direction is (Eq6) expressed by $\alpha_{1i}$ and the condition under which the imaging position is not varied in the sub-scanning direction is (Eq9) expressed by $\alpha'_{1i}$. When the base materials having linear expansion coefficients close to these are respectively selected, variations in imaging characteristics can be suppressed if temperature variation occurs, and variations in beam diameter due to defocus occurrence can be suppressed.

Further, effects of reducing the variations in fθ characteristics with respect to the main scanning direction and suppressing variations in face tilt correction function with respect to the sub-scanning direction can be obtained.

At least in the case where the material of the first mirror having the same linear expansion coefficient as $\alpha_2$ of the material of the second mirror is used, if they are close to the linear expansion coefficients $\alpha_{1i}$ and $\alpha'_{1i}$ obtained from (Eq6) and (Eq9), the effect can be obtained. That is, the effect can be obtained if $|\alpha_2-\alpha_{1i}|>|\alpha_1-\alpha_{1i}|$ and $|\alpha_2<\alpha'_{1i}|>|\alpha_1-\alpha'_{1i}|$ Eleventh Embodiment In an exposure apparatus according to the embodiment, powers of two mirrors are adjusted into optimum conditions.

In imaging elements for scanning optical system formed by two mirrors, the power of the first mirror in the main scanning direction or the sub-scanning direction or powers in both directions are set negative, the powers of the second mirror both in the main scanning direction and the sub-scanning direction are set positive, and the linear expansion coefficient of the base material of the first mirror is set larger than the linear expansion coefficient of the base material of the second mirror.

Conventionally, since mirrors are created by a single base material, the influence by temperature change has been suppressed by dispersing the powers while providing the same signs as the total power to both powers. The optimal combination of base materials when the first element power is set negative and the last element power is set positive are considered.

For example, if the first mirror is formed by PMMA and the second mirror is formed by PC, Linear expansion coefficient of PMMA: $6.9 \times 10^{-5}$(/degree)

Linear expansion coefficient of PC: $6.2 \times 10^{-5}$(/degree)

and the influence by temperature change can be further suppressed than the case where they are both PC or PMMA.

Twelfth Embodiment

In an exposure apparatus incorporating an optical beam scanning device according to the embodiment, optical path lengths between the deflecting means reflection surface and the first mirror and the second mirror are adjusted.

Specifically, they are set as (optical path length between the deflecting means reflection surface and the first mirror) <(optical path length between the first mirror and the second mirror).

This is for enabling the mirror to be mountable, when the mirror is used and the imaging elements are locates so as not to block the optical path so that the mirror normal forms an angle relative to the incident light, if the angle of the mirror normal relative to the incident light is made smaller.

Conventionally, in the case where (optical path length between the deflecting means reflection surface and the first mirror)>(optical path length between the first mirror and the second mirror), since the angle between the beam between the deflecting means reflection surface and the first mirror and the beam between the first mirror and the second mirror are required to be made larger so that the second mirror may not block the scanning line between the deflecting means reflection surface and the first mirror, and the mirror shape is required to be twisted in order to correct the scanning line curve bow from the arrangement, the condition is disadvantageous in imaging characteristics.

Contrary, in the embodiment, since the second mirror is located at the opposite side to the first mirror with the rotating polygon mirror in between, that is, at the side where there is no beam with the rotating polygon mirror in between, the second mirror is prevented from blocking the optical path between the deflecting means reflection surface and the first mirror even with a small angle.

Accordingly, the deflecting means reflection surface, the first mirror, and the second mirror are located so that (optical path length between the deflecting means reflection surface and the first mirror)<(optical path length between the first mirror and the second mirror) holds.

a) The better, the smaller the inclination of the first mirror surface relative to the incident light of the first mirror. When the first mirror surface has a power in the main scanning direction, the reflection point seen from the sub-scanning direction section is displaced, and the amounts of curved component produced in the scanning line according to the main scanning direction position when the mirror is inclined in the sub-scanning direction are desirably suppressed to the minimum.

b) The second mirror is required to be located so as not to block the optical path of the beam between the rotating polygon mirror and the first mirror, and to keep the optical path lengths between the second mirror end and the rotating polygon mirror and the first mirror while making the angle smaller, the better, the longer the optical path length between the first mirror and the second mirror.

Further, it is desired that the second mirror is placed in the location where there is no beam between the rotating polygon mirror and the first mirror so that the above condition may not become a constraint condition of angle.

As a problem, it is necessary to locate the mirror so as not to contact the rotating polygon mirror, however, the rotating polygon mirror can keep precision if there is latitude of about 0.5 mm from the area of use.

On the other hand, the surface having a power typically requires, latitude of about 2 to 3 mm, and it is easier to avoid the rotating polygon mirror as the degree.

In addition, as described above, the image side principal point position in the sub-scanning direction can be made much nearer the image plane side, the degree of freedom of mounting can be increased and the lateral magnification $\beta$ in the sub-scanning direction can be suppressed by taking the optical path length between the second mirror and the image plane larger. This can be effective for the thirteenth embodiment, which will be described later.

Thirteenth Embodiment

In an exposure apparatus incorporating an optical beam scanning device according to the embodiment, optical path lengths between the respective elements and the power and the lateral magnification in the sub-scanning direction are adjusted.

Using a pair of optical elements, the sub-scanning direction power of the first optical element is set negative and the sub-scanning direction power of the second optical element is set positive. The optical path lengths between the pair of optical elements, and the power and the lateral magnification in the sub-scanning direction are set in the following relationships.

[(optical path length between the last element and the image plane)/(optical path length between the deflector reflection point and the last element)]>(2×lateral magnification in the sub-scanning direction)

lateral magnification in the sub-scanning direction<0.5

[(optical path length between the last element and the image plane)/(optical path length between the deflector reflection point and the last element)]>1.5

This is because, in the optical system in which the beam enters diagonally the incident surface of the rotating polygon mirror due to design or the influence by variations in assembly or the like, it is desired that the influence by the face irregularities of the rotating polygon mirror in the sub-scanning direction on the beam position in the sub-scanning direction is suppressed. For the purpose, the lateral magnification in the sub-scanning direction is suppressed.

On the other hand, securing the distance between the last imaging element and the image plane while suppressing the increase in the above described T.T. enables improvement in the degree of freedom in shape and arrangement of process units or the like and downsizing as M/C.

In the conventional JP-A No. 4-277715, the configuration for suppressing the lateral magnification in the sub-scanning direction to the 1.2 or less is discussed. From the examples embodying the configuration, the distance between the last imaging element and the image plane is very short and the restriction on mounting becomes significantly large. The suppression of lateral magnification and increase in distance between the last imaging element and the image plane are contradictory requirements.

Contrary, in the embodiment, in the case of a scanning optical system having the face tilt correction function, the sub-scan surface of the deflector reflection surface and the image plane are designed to have a conjugate relationship. The lateral magnification in the sub-scanning direction at this time is defined as $\beta$.

Figure 9:
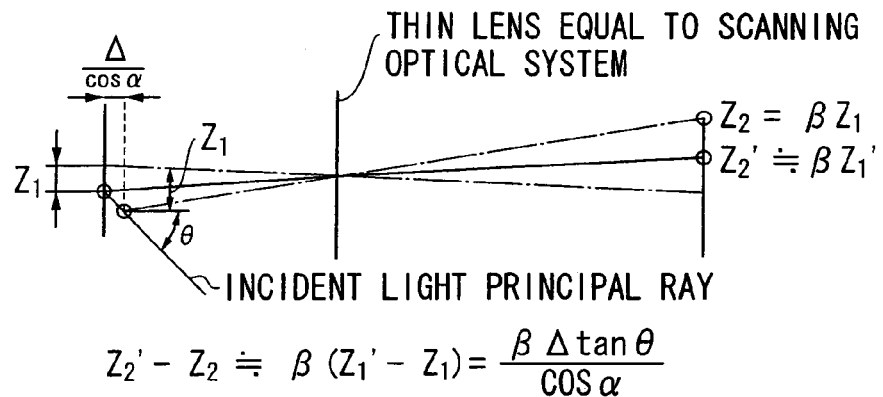
FIG. 9 is a schematic diagram for explanation of the influence by the face irregularities of the rotating polygon mirror of the deflector on the beam position on the image plane in the sub-scanning direction and the amounts thereof.

When the beam diagonally enters the deflection surface, the position of the beam on the rotating polygon mirror in the sub-scanning direction changes due to face irregularities. This state is shown in FIG. 9. Since the amount of face irregularities on the rotating polygon mirror is very small, the lateral magnification between the reflection surface of the rotating polygon mirror and the image plane based thereon changes little. Accordingly, assuming that the amount of face irregularities is $\Delta$, the angle between the incident beam and the normal of the rotating polygon mirror is $\alpha$, the incident angle to the rotating polygon mirror in the sub-scanning direction is $\theta$, and the lateral magnification in the sub-scanning direction is $\beta$, the amount of displacement of beam position on the rotating polygon mirror is $\Delta \times \tan \theta / \cos \alpha$, and the amount of variation in position on the image plane as an image thereof becomes $\beta \times \Delta \times \tan \theta / \cos \alpha$.

From the above discussion, it is known that, in order to suppress the position variation on the image plane while tolerating $\Delta$ at some degree, the lateral magnification $\beta$ in the sub-scanning direction may be made as small as possible.

That is, as a measure for suppressing the influence by the face irregularities to the optical system of diagonal incidence, a method of suppressing the lateral magnification is considered. As a solution for this, it is conceivable that the last optical element is made nearer the image plane and the face tilt correction function is provided to the last optical element. However, this makes the degree of freedom of mounting smaller. It is strongly desired that the distance between the last optical element and the image plane is taken larger, however, it is not preferable that the above described T.T. is taken longer.

Study on how far this is realized while satisfying requirements for fθ characteristics, face tilt correction function, image plane curvature correction in the main scanning direction and the sub-scanning direction, uniform beam diameter over the entire scanning area required for the scanning optical system is made.

In the case of using one lens, in the thin optical system, (optical path length between the last element and the image plane)/(optical path length between the deflecting means reflection surface and the image plane)≈lateral magnification in the sub-scanning direction holds. As a target, it is desired that the lateral magnification in the sub-scanning direction is made about half in the relationship. (distance between the last imaging element and the image plane)≈(distance from the last imaging element position to the combined image side principal point)+1/((1/focal length)−(1/distance between the rotating polygon mirror reflection surface and the object point side principal point)) holds, however, if the focal length is made larger, the image frequency is required to be higher. It is not preferable to adopt this.

Accordingly, the object point side principal point and the image plane side principal point position in the sub-scanning direction are made nearer the image plane side.

In order to make the optical path length between the rotating polygon mirror reflection point and the object point side principal point longer, and the optical path length between the image side principal point and the image plane shorter to reduce the magnification, the power of the first mirror is made negative and the power of the second mirror is made positive also with respect to the sub-scanning direction.

As a result of the study, regarding the relationship, in the case where at least a pair of optical elements (for the invention, mirrors are described) are used and the sub-scanning direction power of the first optical element is made negative and the sub-scanning direction power of the second optical element is made positive, a solution that can realize

[(optical path length between the last element and the image plane)/(optical path length between the deflector reflection point and the last element)]>(2×lateral magnification in the sub-scanning direction)

can be obtained. Further, specifically, it is known that the configuration by which $0.2 < \beta (0.24138, 0.3186, 0.3322, 0.3779) < 0.5$ (optical path length between the last element and the image plane)/(optical path length between the deflector reflection point and the last element)=404/250=1.612>1.5 hold can be realized.

Fourteenth Embodiment

An exposure apparatus incorporating an optical beam scanning device according to the embodiment is configured by combining the eighth embodiment and the thirteenth embodiment.

By the effect of the eighth embodiment, the distance between the second mirror and the image plane can be taken larger. Further, when the thirteenth embodiment enabled by adopting the configuration of the eighth embodiment is realized, if the beam from the pre-deflection optical system is diagonally entered into the rotating mirror, the variation in the sub-scanning direction beam position due to face irregularities can be suppressed.

Fifteenth Embodiment

An exposure apparatus incorporating an optical beam scanning device according to the embodiment is configured by combining the ninth embodiment and the thirteenth embodiment.

According to the structure, the same effect as in the above respective embodiments can be exerted.

Sixteenth Embodiment

Plural beams are scanned, and a mirror for separating beams by folding only part of the beams after they are reflected by the second mirror is provided. Regarding the positions where the beams are separated, the farther the folding point on the second mirror from the polygon mirror in the sub-scanning direction, the closer the position to the second mirror.

When the plural scanning lines are provided by one set of optical system, it is desired that characteristics are improved while suppressing the above described T.T. and suppressing the size of the imaging mirror.

Conventionally, there has been a system using lenses, however, in the system using lenses, lens thickness becomes thicker and the cost rises in order to configure it so that the width of the scanning lines may not change when the wavelength is shifted. Further, with the thin lens thickness, there has been a problem that the width of the scanning lines changes when the wavelength is shifted.

Contrary, in the embodiment, mirrors free from influence of wavelength is used. A problem that the incident light and exiting light are in the same direction of the optical elements and the optical paths overlap in the vicinity of the mirrors occurs as is the case where mirrors are used, however, a configuration as a solution for this is devised. Such configuration is as follows.

The configuration is that plural beams are scanned, and the mirror for separating beams by folding only part of the beams after reflected by the second mirror is provided. Regarding the positions where the beams are separated, the farther the folding point on the second mirror from the polygon mirror in the sub-scanning direction, the closer the position to the second mirror.

According to the configuration, as seen from FIG. 5 cited in the seventh embodiment, viewing the sub-scanning section of the scan beam locus of the beam after the second mirror, regarding beams separable as beams between the first mirror and the second mirror, the beams at the upper side in the sub-scanning direction (farther from the polygon mirror in the sub-scanning direction) are at upstream side of the optical path, namely, the second mirror side.

The separation point where the beam RAY 12 is separated from beams RAY 22, RAY 32, and RAY 42 is located in a position where the distance in the optical axis direction from the second mirror is the shortest, that is, the closest position from the second mirror, the separation point where the beam RAY 22 is separated from beams RAY 32 and RAY 42 is located in a position where the distance in the optical axis direction from the second mirror is the second shortest, and the separation point where the beam RAY 32 is separated from beam RAY 42 is located in a position where the distance in the optical axis direction from the second mirror is the longest, that is, the farthest position from the second mirror.

Accordingly, the separation position is placed so that the beam farther folding point on the second mirror from the polygon mirror in the sub-scanning direction is closer to the second mirror. This can make the optical path length longer after the separation of the beam separable at the closest position to the second mirror while shortening the optical path length after the second mirror.

The ability to shorten the optical path length after the second mirror enables downsizing of the unit. Further, the influence of angle shift of the mirror is proportional to the optical path length after mirror arrangement. For example, if the mirror is inclined to $\alpha$, the beam is inclined to $2\alpha$, and when the beam advances at distance L, the amount of shift becomes $L \times \tan(2\alpha)$. Considering this, because L becomes smaller, also the influence of angle shift can be reduced.

Making the optical path length of the beam separable at the most upstream side after separation longer, the photoconductor pitch and the distances between the photoconductor and the optical system can be secured, and a large-scaled process unit can be accommodated.

Seventeenth Embodiment

An exposure apparatus incorporating an optical beam scanning device according to the embodiment is configured by taking intervals of the respective beams on the second mirror as large as the intervals between beams to be separated at the down stream side in the sixteenth embodiment.

According to the configuration, since the lateral magnification $\beta$ in the sub-scanning direction is suppressed in order to reduce the influence of the face irregularities of the rotating polygon mirror, the closer to the image plane, the smaller the intervals between the respective beams become.

From this, the intervals between beams on the second mirror are taken larger as the beams are separated at more downstream side as follows.

Interval between RAY1 and RAY2<interval between RAY2 and RAY3<interval between RAY3 and RAY4

Eighteenth Embodiment

In the embodiment, plural scanning lines are provided with one set of optical system, and, in the optical system for guiding the respective scanning lines to distant positions by separating means, the thickness of the rotating polygon mirror of the deflector is made small. This is based on the relationship of rotating polygon mirror thickness $\propto$ windage loss. Making the thickness of the rotating polygon mirror of the deflector small suppresses the heat generation and noise by reducing motor power, and raises the rotation number.

In the conventional deflector, the mirror thickness is thick. Accordingly, the motor power increases, and the cost, heat generation, and noise increase. On this account, it becomes difficult to raise the rotation number.

Contrary, in the embodiment, plural beams are scanned and the seventh embodiment and the thirteenth embodiment are combined. Further, in the configuration, plural beams intersect in the sub-scanning direction between the rotating polygon mirror and the first mirror.

In this case, the twelfth embodiment maybe additionally combined.

Thereby, while making the thickness of the rotating polygon mirror of the deflector small and the motor power small, and suppressing the heat generation and noise, the rotation number can be raised.

Nineteenth Embodiment

The embodiment is an optical system in which, while the size of the imaging mirror is suppressed and the thickness of the rotating polygon mirror is suppressed, the distance from the first separation point to the image plane is secured.

Specifically, plural beams are scanned and the eighth embodiment and the thirteenth embodiment are combined. Further, in the configuration, plural beams intersect in the sub-scanning direction between the rotating polygon mirror and the first mirror.

In this case, the twelfth embodiment may be additionally combined.

Thereby, the distance from the first separation point to the image plane can be secured.

EXAMPLE

As below, a specific exposure apparatus according to the embodiments of the invention will be described in detail by referring to the drawings.

Figure 11A:
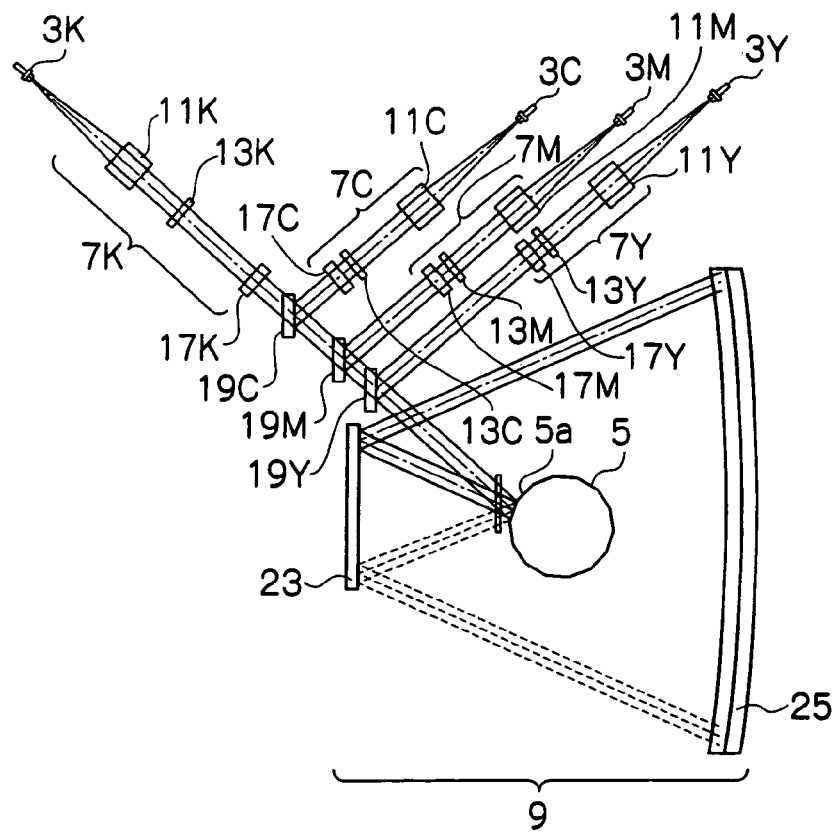
FIG. 11A is a plan view showing an optical system when all mirrors of the post-deflection optical system are developed.
Figure 11B:
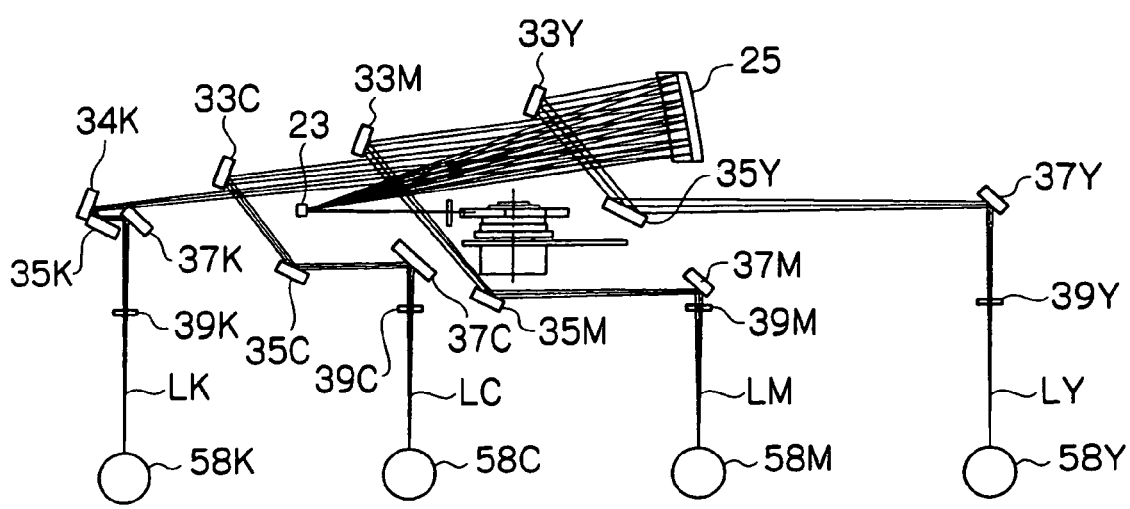
FIG. 11B is a side sectional view showing a post-deflection optical system.
Figure 11C:
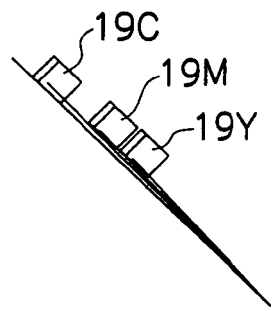
FIG. 11C is a side sectional view showing the pre-deflection optical system.

FIGS. 11A to 11C show an exposure apparatus as an embodiment of the invention.

FIG. 11A shows a state of the exposure apparatus incorporated into an image forming apparatus to the second mirror seen from the planer direction (from the rotational axis direction of a deflector device, which will be described later) and FIG. 11B shows a state seen from a direction perpendicular to the planer direction shown in FIG. 11A (from the perpendicular direction to the rotational axis direction of the same deflector device). The states in which the deflection angle by the deflector device is 0° with respect to the light beam passing through optical elements provided between the reflection point of the deflector device and the scanned surface are shown, respectively. In this type of exposure apparatus, since color images are formed using subtractive color mixing in respective image forming units for forming latent images with respective beams, typically, four kinds of image data color-separated into color components of Y, namely, yellow, M, namely, magenta, C, namely, cyan, and K, namely, black (for inking) and four sets of various units for forming images with respect to each color component corresponding to Y, M, C, and K are used. Accordingly, in the description as below, image data with respect to each component and unit corresponding to each of them are discriminated by adding Y, M, C, and K to the reference signs.

As shown in FIG. 11B, the exposure apparatus scans the first to fourth beams LY, LM, LC, and LK for forming images corresponding to the color components color-separated based on the known subtractive color mixing. Respective photoconductors 58 (Y, M, C, and K, hereinafter, common description to elements forming all of the first to fourth exposure systems will be represented by adding "*" to the reference signs), are serially arranged in the order of 58Y, 58M, 58C, and 58K in positions corresponding to the respective scanning lines of four laser beams L* output from the exposure apparatus to the outside by the third mirrors 37Y, 37M, 37C, and 37K used for exposure of the respective images of yellow, magenta, cyan, and black.

The laser beams L* to be guided to the respective photoconductor drums 58* by the respective mirrors 37Y, 37M, 37C, and 37K of the exposure apparatus are output from four semiconductor laser array elements, and irradiated from between the respective charger units and the respective developing units (not shown) onto predetermined positions on the circumferential surfaces of the respective photoconductor drums 58* corresponding to the respective mirrors 37Y, 37M, 37C, and 37K.

The exposure apparatus has four laser array elements 3Y, 3M, 3C, and 3K, a deflector device 5, pre-deflection optical systems 7*, and a post-deflection optical system 9.

The four laser array elements 3Y, 3M, 3C, and 3K have two light emitting points in each of one packages for emitting laser beams corresponding to the image data for four colors corresponding to the images with respect to each of color-separated color components formed by the respective four sets of image forming units of the image forming apparatus (not shown). The deflector device 5 includes rotatably formed plural reflection surfaces 5a, and deflects the laser beams output from the respective laser array elements at a predetermined angular speed toward the scanned surfaces provided in predetermined positions, namely, four photoconductor drums 58Y, 58M, 58C, and 58K of the four sets of image forming units by rotating the individual reflection surfaces 5a at a predetermined speed. The pre-deflection optical systems 7* are provided between the respective laser array elements 3* and the deflector device 5, and shape the respective sectional beam spot forms of the respective laser beams L* in predetermined forms and arrange the respective beams as four sets of laser beams. The post-deflection optical system 9 images laser beams deflected (reflected) by the deflector device 5 onto the photoconductor drums 58*.

Here, the direction (the direction parallel to the direction in which the reflection surfaces 5a are rotated) in which the respective laser beams are deflected (continuously and linearly reflected) by the deflector device 5 is referred to as "main scanning direction" and the direction perpendicular to the main scanning direction and parallel to the axis direction of the rotational axis when the reflection surfaces 5a of the deflector device 5 are rotated at the time of developing folds by the mirror is referred to as "sub-scanning direction".

Eight laser beams emitted from the respective laser array elements are converted into nearly parallel beams by four collimator lenses 11Y, 11M, 11C, and 11K provided close to the respective laser array elements. All collimator lenses may be replaced by finite focal length lenses according to appropriate selection of lenses of the post-deflection optical system 9.

The eight, four sets of laser beams collimated by the respective collimator lenses are provided with predetermined sectional beam forms by diaphragms 13Y, 13M, 13C, and 13K placed in the focal position at the rear side of the collimator lenses, and the pairs of laser beams LYa and LYb, LMa and LMb, and LCa and LCb, and LKa and LKb are mutually aligned at predetermined intervals with respect to the sub-scanning direction as a direction in which they are deflected by the deflector device 5. The Ray 1a, Ray 1b, Ray 2a, Ray 2b, Ray 3a, Ray 3b, Ray 4a, and Ray 4b shown in the sectional view (FIGS. 5 and 7) are used as LYa, LYb, LMa, LMb, LCa, LCb, LKa, and LKb, respectively.

Here, since two beams are output from the respective laser array elements and the beams output from one laser array are nearly superimposed, in the case where there is no special need to separately describe these two beams, they are described as one beam. That is, the beam L* generically refers to L*a and L*b.

Figure 12:
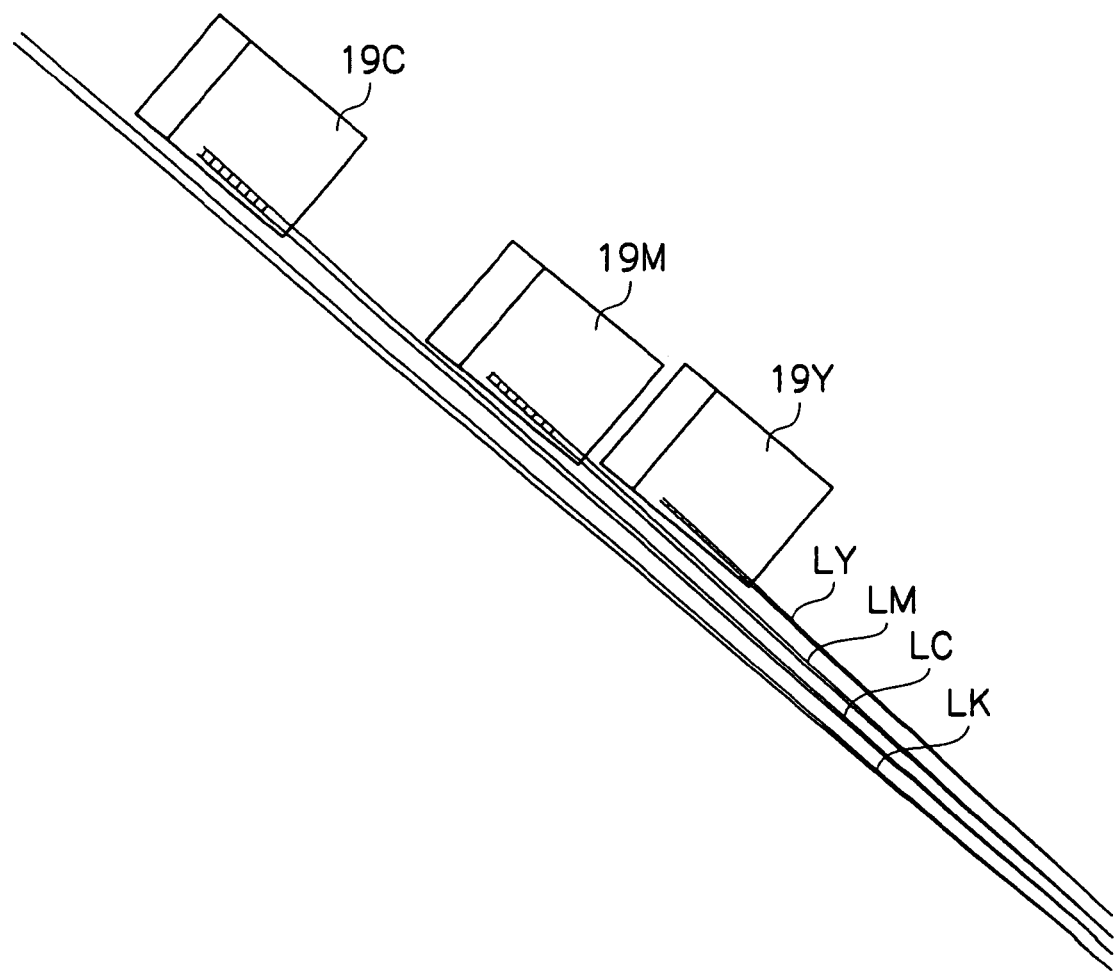
FIG. 12 is a side sectional view showing the pre-deflection optical system.

FIG. 12 shows mirrors for combination and a relationship among the respective beams folded by the mirrors for combination.

The beam LK collimated by the collimator lens 11K is provided with convergence at least with respect to the sub-scanning direction by a cylinder lens 17K, and then, sequentially passes through space shifted from laser combining mirrors 19Y, 19M, and 19C toward the sub-scanning direction and guided to the reflection surface 5a of the deflector device 5.

Similarly, the beam LC collimated by the collimator lens 11C is provided with convergence at least with respect to the sub-scanning direction by a cylinder lens 17C, and then, reflected by the laser combining mirror 19C, aligned so that the beam is substantially superimposed on the laser beam LY with respect to the main scanning direction and passes inner side of the laser beam LK in the sub-scanning direction (near the center of the sub-scanning direction length of the reflection surface 5a of the deflector device 5), and sequentially passes through space shifted from laser combining mirrors 19M and 19Y toward the sub-scanning direction and guided to the reflection surface 5a of the deflector device 5.

Further, the beam LM collimated by the collimator lens 11M is provided with convergence at least with respect to the sub-scanning direction by a cylinder lens 17M, and then, reflected by the laser combining mirror 19M, aligned so that the beam is substantially superimposed on the laser beam LC folded by the laser combining mirror 19C with respect to the main scanning direction, and passes through an optical path shifted from the laser combining mirror 19Y toward the sub-scanning direction and guided to the reflection surface 5a of the deflector device.

Furthermore, the beam LY collimated by the collimator lens 11Y is provided with convergence at least with respect to the sub-scanning direction by a cylinder lens 17Y, and then, reflected by the laser combining mirror 19Y, aligned so that the beam is substantially superimposed on the laser beam LM folded by the laser combining mirror 19M with respect to the main scanning direction and located at the outer side than the laser beam LM with respect to the sub-scanning direction and at the opposite side to the laser beam LK relative to the center of the sub-scanning direction length of the reflection surface 5a of the deflector device 5, and guided to the reflection surface 5a of the deflector device 5.

The eight (four sets of) laser beams sequentially deflected by the rotation of the respective reflection surfaces 5a of the deflector device 5 are passed through the first and second imaging mirrors 23 and 25 (post-deflection optical system 9), and thereby, provided with predetermined imaging characteristics by the respective mirrors. Then, their imaging conditions (shift from the ideal condition in which beams are focused on one point on the scanned surface), imaging positions (positions of principal rays in the main scanning direction and the sub-scanning direction), sectional beam diameters and forms thereof, aberration statuses, or the like are optimally set, and the beams are guided to the scanned surface (circumferential surfaces of the photoconductor drums 58*).

Thereby, while reducing the curve of scanning lines, suppressing variations in sub-scanning direction position due to variations in inclination of the faces of the rotating polygon mirror forming the reflection surfaces of the deflector device (face tilt correction), and keeping the fθ characteristics for fixing the scan speed of the beams in the main scanning direction, a function of suppressing image plane curvature for uniformizing the imaging positions in the entire scanning area is provided.

The respective laser beams guided to the scanned surfaces are, at the downstream side of "the post-deflection imaging element 9 as non-flat imaging optical means having a function of bending the beams relative to at least the sub-scanning direction", namely, between the post-deflection imaging element 9 and the scanned surfaces, sequentially folded by mirrors 33Y, 33M, and 33C as separation mirrors for separating beams, a mirror 34K for folding the optical paths, and mirrors 35Y and 37Y, 35M and 37M, 35C and 37C, and 35K and 37K for guiding the beams folded by those mirrors to further separated locations, respectively, and passed through dust proof glasses 39* and irradiated onto the scanned surface.

Each of the separation mirrors and the mirrors 33Y, 33M, 33C, 34K, 35Y, 35M, 35C, 35K, 37Y, 37M, 37C, and 37K is fabricated by forming a metal layer of aluminum or the like as a reflection surface in a predetermined thickness on one side of a typical float glass by vapor deposition, for example.

Figure 10A:
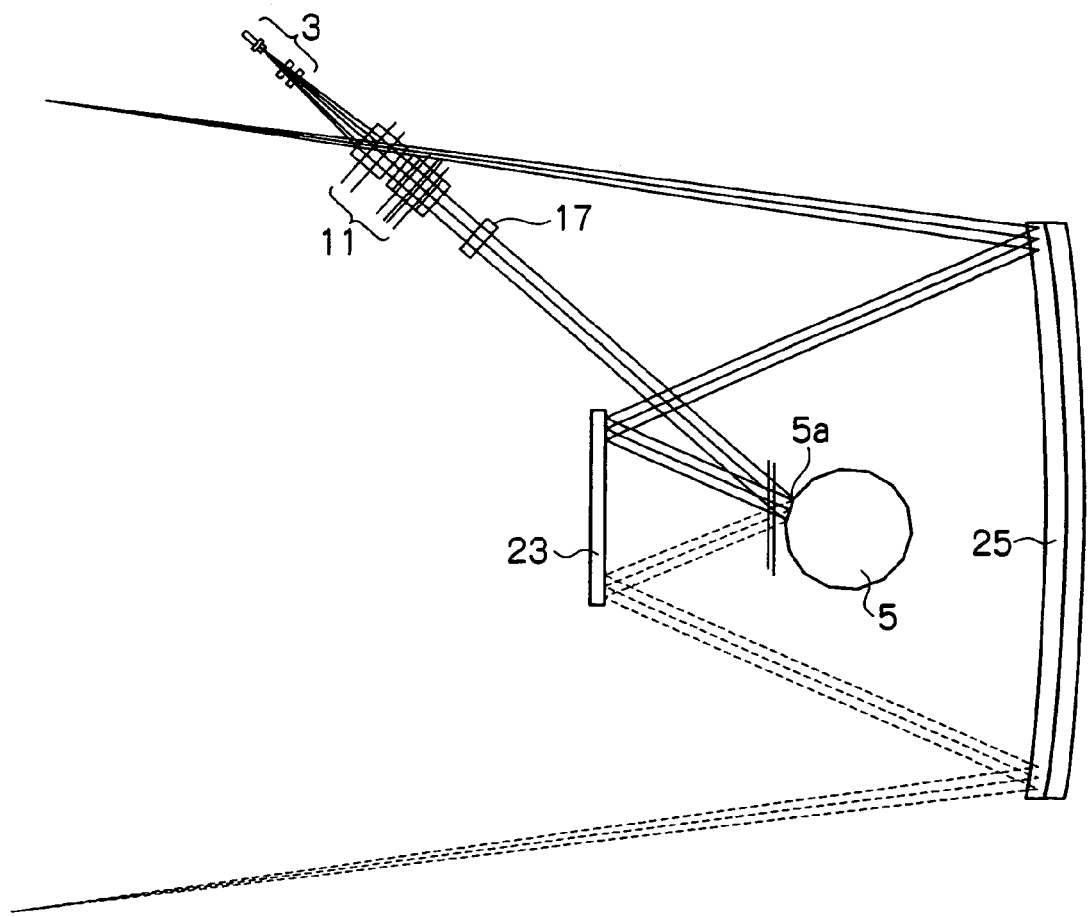
FIG. 10A is a plan view showing an optical system when all mirrors are developed.
Figure 10B:
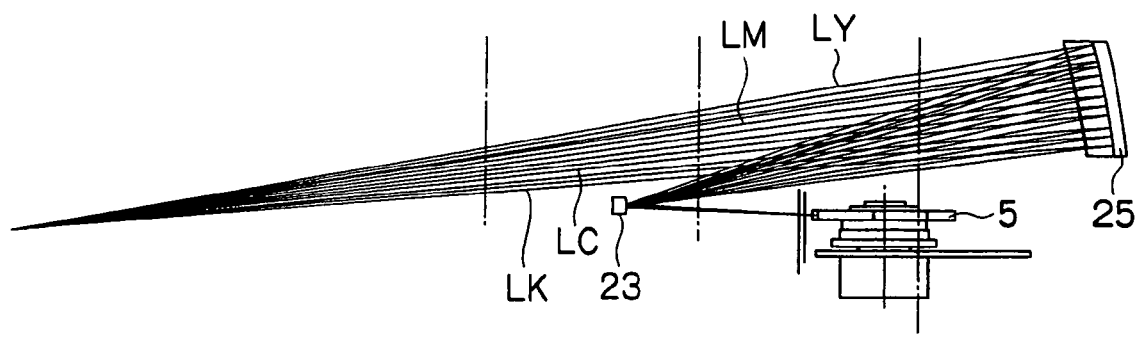
FIG. 10B is a side sectional view showing a post-deflection optical system.
Figure 10C:
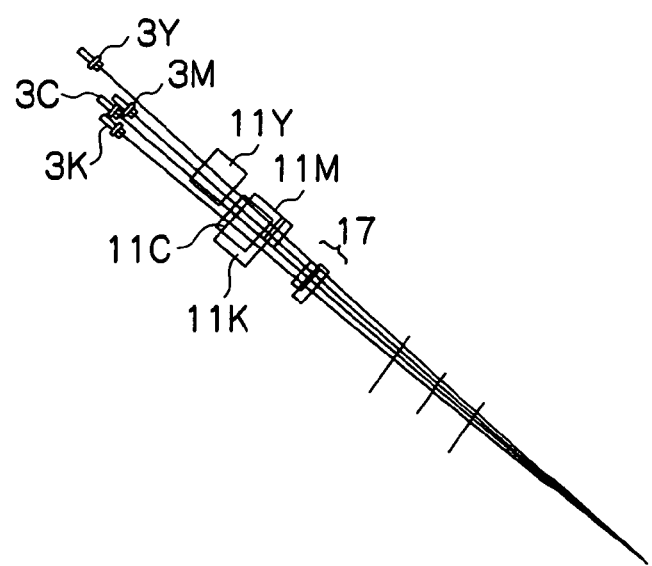
FIG. 10C is a side sectional view showing a pre-deflection optical system.

The post-deflection optical system is configured by a pair of imaging mirrors, and the first mirror is displaced in a predetermined direction (upward in FIG. 11) with respect to the sub-scanning direction relative to the rotating polygon mirror, and the second mirror is displaced in the same direction as the predetermined direction (upward in FIG. 11) relative to the first mirror. At this time, when FIG. 10B showing the sub-scanning direction section in a state in which the folds after reflection by the two mirrors are developed is seen, it is known that the beam passes in the predetermined direction (upward in FIG. 10B) seen from the first mirror.

Here, there are mirrors 33Y, 33M, and 33C for separating beams by folding only part of the beams after reflected by the second mirror 25 are provided. Regarding the positions where the beams are separated, the farther the folding point on the second mirror 25 from the polygon mirror in the sub-scanning direction, the closer the position to the second mirror 25.

The order of separation mirrors in which the mirrors can be placed so as not to block the optical paths between the first mirror 23 and the second mirror 25 is the order of beams with reflection points on the second mirror separated from the polygon mirror in the sub-scanning direction at the upstream side of the optical path. As seen from FIG. 11B, beams can be separated at the upstream side in the order of the beams LY, LM, and LC.

From the second mirror to the imaging plane, optical axes from the pre-deflection optical systems are located in the same order as the above described order so that the beams have space in between. Accordingly, from the second mirror 25 to the imaging plane, there is an interval for insertion of the separation mirror between LY and LM at the most upstream side, and the space can be secured sequentially between the LM and LC and between LC and LK.

Here, since the lateral magnification in the sub-scanning direction is suppressed smaller in order to reduce the influence of the face irregularities of the rotation polygon mirror, the closer to the image plane, the smaller the intervals between the respective beams become.

From this, the intervals between beams on the second mirror are taken larger as the beams are separated at more downstream side as:

Interval between LY and LM<interval between LM and LC<interval between LC and LK Thereby, the optical path length after the separation of the beam separable at the closest position to the second mirror can be made longer while shortening the optical path length after the second mirror.

The ability to shorten the optical path length after the second mirror enables downsizing of the unit. Further, the influence by angle shift of the mirror is proportional to the optical path length after mirror arrangement. For example, if the mirror is inclined to α, the beam is inclined to 2α, and when the beam advances at distance L, the amount of shift becomes L×tan(2α). Considering this, because L becomes smaller, the influence of angle shift can be also reduced.

The photoconductor pitch and the distances between the photoconductor and the optical system can be secured by making the optical path length of the beam separable at the most upstream side after separation longer, and a large-scaled process unit can be accommodated.

Table 1 provides optical data of the pre-deflection optical system in the working example, Table 2 provides optical data of the post-deflection optical system in the working example, and Table 3 provides data representing shapes of imaging mirrors and paraxial major values. Since the equation of Table 3 is partly expressed by expressions commonly representing the expressions in the sub-scanning direction and the main scanning direction, "'" representing the sub-scanning direction is omitted.

Further, since the sign of thickness in Table 1, 2, 4, and 5 is described using local coordinates the polarity of which switches at each reflection, the signs are different from the optical path lengths used for study with paraxial light.

Regarding the curvatures of mirrors shown in Tables 3 and 6, since the sign of the surface shape 1 becomes opposite in polarity assuming that the curvature is positive when the center of curvature is located at the advancing direction of the incident light relative to the mirror surface and the curvature is negative when the center of curvature is located at the opposite side of the advancing direction of the incident light, the curvature of the first mirror becomes positive both in the main scanning direction and the sub-scanning direction and the curvature of the second mirror becomes negative both in the main scanning direction and the sub-scanning direction. This shows that the shape of the first mirror is convex both in the main scanning direction and the sub-scanning direction and the shape of the second mirror is concave both in the main scanning direction and the sub-scanning direction.

Further, regarding the powers of the respective mirrors, it is shown that the power of the first mirror is negative both in the main scanning direction and the sub-scanning direction and the power of the second mirror is positive both in the main scanning direction and the sub-scanning direction.

Furthermore, the absolute value of the sub-scanning direction power of the first mirror is larger than the absolute value of the sub-scanning direction power of the second mirror.

Further, the principal point position $\Delta$ is also shown, and both the object point side principal point $\Delta_1$ and the image side principal point $\Delta_2$ take positive values. This means that the object point side principal point is located nearer the image plane side than the first mirror and the image side principal point is located nearer the image plane side than the second mirror, and that contributes to increase in degree of freedom in mounting by securing the distance from the mirrors to the image plane.

Moreover, in Tables 3 and 6, equations and coefficients for defining mirror shapes within the post-deflection optical system are shown, and the two mirrors have terms with non-zero coefficients of odd number order also in the z-direction and asymmetric shapes in the sub-scanning direction. Further, the coefficients of the term $\Sigma\text{al\_m}xy^lx Z^m = \Sigma\text{al\_m}xy^l \times Z^m$ are non-zero terms over higher order, and it is known that the curvatures in the main scanning direction and the sub-scanning direction asymmetrically change according to the positions in the main scanning direction and the sub-scanning direction.

From these terms, in the pair of mirrors, the imaging characteristics, fθ characteristic, curve of scanning line, and face tilt correction function can be sufficiently satisfied.

Furthermore, as shown in Tables 2 and 5, the base material of the first mirror is PMMA and the base material of the second mirror is PC.

Linear expansion coefficient of *PMMA:* $6.9 \times 10^{-5}$ (/degree)

Linear expansion coefficient of *PC:* $6.2 \times 10^{-5}$ (/degree)

The influence of thermal expansion by temperature can be further reduced than the case where they are both PC by making the linear expansion coefficient of the basic material of the first mirror.

The linear expansion coefficient ratios $\alpha_{1i}/\alpha_2$ in Tables 3 and 6 represent ideal ratios of linear expansion coefficients obtained from (Eq6) and (Eq9), respectively, by which variations due to temperature change in the main scanning direction and the sub-scanning direction do not occur. Actually, the values are at the central parts, however, practically, values sufficiently representative of the whole mirrors because the respective mirrors have no drastic power changes.

In the case of Table 3, ideally, the linear expansion coefficient ratio in the main scanning direction is 7.5 and the linear expansion coefficient ratio in the sub-scanning direction is 22.8, however, the ratio between PMMA and PC is on the order of 1.1. The correction effect is greater than that of the same material, but the cost becomes higher. Accordingly, it is advantageous in performance that the ratio is made into 9.5 using glass for the second mirror to have a linear expansion coefficient of $72 \times 10^{-7}$.

Regardless to say, also in this case, the linear expansion coefficient of the base material of the first mirror is larger than the linear expansion coefficient of the base material of the second mirror.

When the first mirror is PMMA, in both cases where the second mirror is PC and glass, if the shift from the ideal value is large, $|\alpha_2 - \alpha_{1i}| > |\alpha_1 - \alpha_{1i}|$ and $|\alpha_2 - \alpha'_{1i}| > |\alpha_1 - \alpha'_{1i}|$.

Here, $\alpha_{1i} = -\alpha_2(-1 + d_2\phi_{10})^2\phi_{20}/+\phi_{10}$ $\alpha'_{1i} = -\alpha_2(-d_2 - d_1 + d_2 d_1 \phi'_{10})_2\phi_{20}/(d_1^2\phi'_{10})$ are satisfied. When the second mirror is glass, because $|\alpha_2 - \alpha_{1i}| > |\alpha_1 - \alpha_{1i}|$ is satisfied but the values of $|\alpha_2 - \alpha_{1i}| > |\alpha_1 - \alpha_{1i}|$ themselves are small, that is not problematic.

Further, comparing the values of (optical path length between the deflecting means reflection surface and the first mirror) and (optical path length between the first mirror and the second mirror) shown below Tables 2 and 5, the relationship:

(optical path length between the deflecting means reflection surface and the first mirror)<(optical path length between the first mirror and the second mirror)

is satisfied.

Further, regarding the respective beams, it is shown that (optical path length between the last element and the image plane)/(optical path length between the deflector reflection point and the last element) >2×lateral magnification in the sub-scanning direction is satisfied.

Moreover, lateral magnification in the sub-scanning direction<0.5 (optical path length between the last element and the image plane)/(optical path length between the deflector reflection point and the last element)>1.5 hold.

Figure 13:
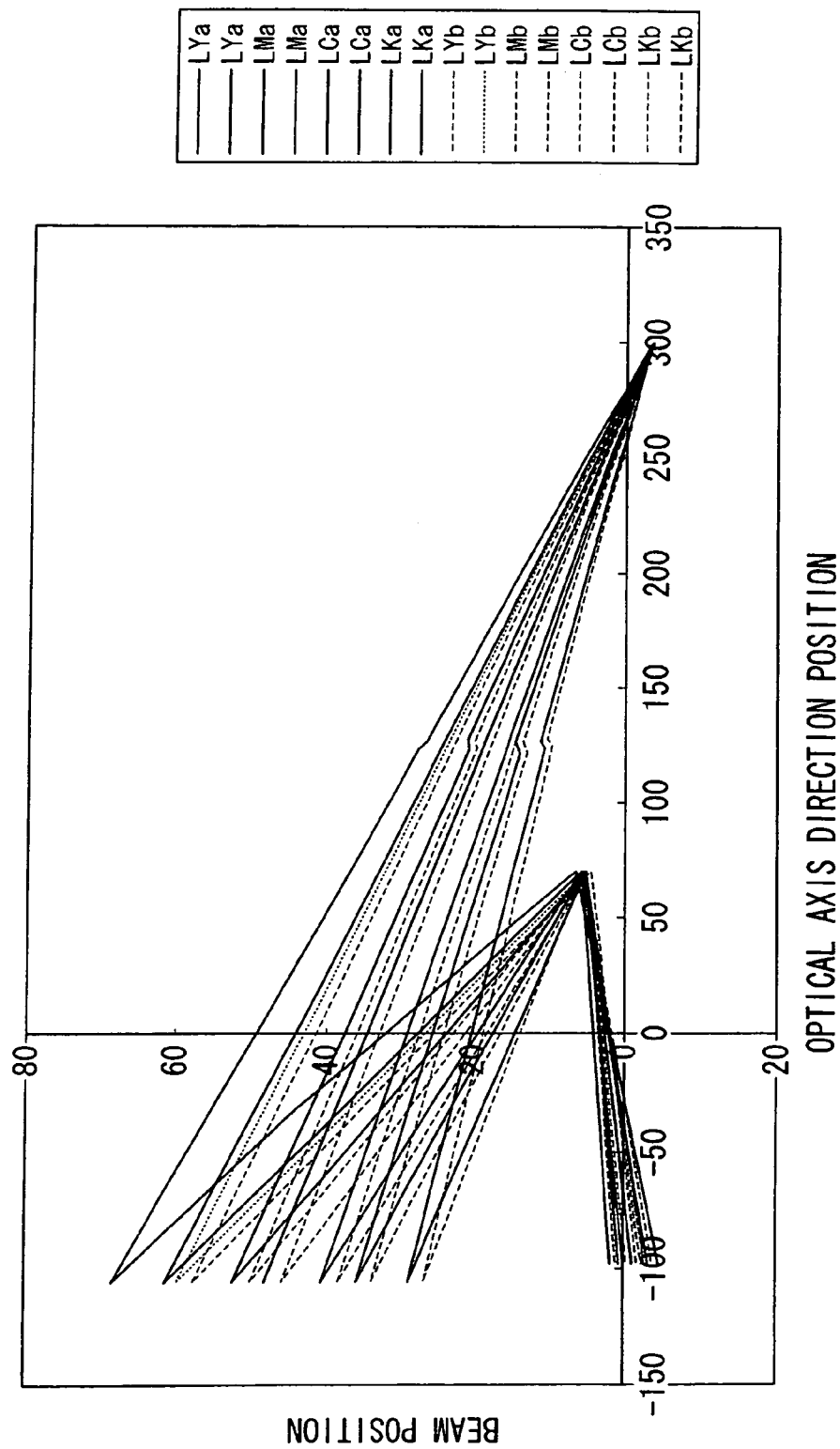
FIG. 13 is a schematic diagram showing relationships between beam positions and optical axis direction positions of beams.

FIG. 13 shows the optical paths of beams further enlarged. The origin of the lateral axis indicates position on the reflection surface of the deflector and the longitudinal axis indicates sub-scanning direction position. The optical paths in the sub-scanning direction position of nearly 0 and from −100 to 0 in the lateral axis are formed by adding the optical paths of the pre-deflection optical system while developing the folds by the rotating polygon mirror. The state in which the thickness of the rotating polygon mirror is reduced by plural beams intersecting between the rotating polygon mirror and the first mirror in the sub-scanning direction.

In the working example, the optical system for supplying plural beams has been described, however, the case of single beam using one of them may be adopted. In this case, the same operation and effect in the above described respective embodiments can be also exerted.

TABLE 1

| | | |
|---|---|---|
| WAVELENGTH | | 0.00067 mm |
| DEFLECTION ANGLE | | 23.45 DEGREES |
| RADIUS OF INSCRIBED CIRCLE OF ROTATING POLYGON MIRROR | | 23.44 mm |
| ROTATION CENTER OF ROTATING POLYGON MIRROR y | | 21.74 mm |
| ROTATION CENTER OF ROTATING POLYGON MIRROR x | | 8.783 mm |
| NUMBER OF FACETS OF ROTATING POLYGON MIRROR | | 8 FACETS |

| | FINITE LENS | | | |
|---|---|---|---|---|
| | LY | LM | LC | LK |
| IMAGING POSITION | 7238 | 6935 | 6641.4 | 6479.3 |

| | THICKNESS (mm) | | | | CURVATURE (1/mm) | | MATERIAL | DECENTER (mm) | | | | |
|---|---|---|---|---|---|---|---|---|---|---|---|---|
| | | | | | MAIN SCANNING DIRECTION | SUB- SCANNING DIRECTION | | y | LY | LM | LC | LK |
| PRE-DEFLECTION OPTICAL SYSTEM | LY | LM | LC | LK | | | | | | | | |
| | 50 | ← | ← | ← | | | air | | | | | |
| | | | | | 0 | 0.0117 | | | | | | |
| | 5 | ← | ← | ← | | | BK7 | | | | | |
| | | | | | 0 | 0 | | | | | | |
| | 171.6 | 150 | 152.9 | 149.4 | | | air | | | | | |
| | | | | | | | | | −1.15 | −1.94 | −2.5 | −3.21 |
| | 2 | ← | ← | ← | | | BK7 | | | | | |
| | | | | | | | | −0.97 | | | | |
| | 8 | ← | ← | ← | | | air | | | | | |

| | TILT (DEGREES) | | | | | |
|---|---|---|---|---|---|---|
| | AROUND z-AXIS | AROUND y-AXIS | | | | REMARKS |
| | | LY | LM | LC | LK | |
| PRE-DEFLECTION OPTICAL SYSTEM | | | | | | |
| | | | | | | CYLINDER LENS |
| | | −3.55 | −2.72 | −1.91 | −0.92 | |
| | −41.5 | | | | | |
| | | | | | | COVER GLASS |
| | 41.45 | | | | | |

TABLE 2

| | THICKNESS (mm) | | | | CURVATURE) (1/mm) | | | DECENTER (mm) | |
|---|---|---|---|---|---|---|---|---|---|
| | LY | LM | LC | LK | MAIN SCANNING DIRECTION | SUB-SCANNING DIRECTION | MATERIAL | y | z |
| POST-DEFLEC-TION OPTICAL SYSTEM | −62.3409 | | | | | | air | | |
| | −2 | | | | | | BK7 | 7.175 | |
| | −8 | | | | | | air | | |
| | | | | | | | | | 2.818 |
| | | | | | SURFACE SHAPE 1 | | PMMA | | |
| | | | | | | | | | −2.82 |
| | 178.2986 | | | | | | air | | |
| | | | | | | | | | 10.21 |
| | | | | | SURFACE SHAPE 2 | | PC | | |
| | | | | | | | | | −10.2 |
| | −71.8639 | | | | | | air | | |
| | −80 | | | | | | air | | |
| | −80 | | | | | | air | | |
| | −0.18948 | | | | | | air | | |
| | −1.99997 | | | | | | BK7 | | |
| | −170.2 | −170 | −169.956 | −170.074 | | | air | | |

| | | TILT (DEGREES) | | | | | |
|---|---|---|---|---|---|---|---|
| | | AROUND z-AXIS | AROUND y-AXIS | | | | REMARKS |
| | | | LY | LM | LC | LK | |
| | POST-DEFLEC-TION OPTICAL SYSTEM | −41.5 | | | | | |
| | | | | | | | COVER GLASS |
| | | 1.259 | | | | | |
| | | | | | | | FIRST MIRROR |
| | | −1.26 | | | | | |
| | | 2.117 | | | | | |
| | | | | | | | SECOND MIRROR |
| | | −2.12 | | | | | |
| | | | | | | | SEPARATION POINTS OF ray 1 & ray 2, 3, 4 |
| | | | | | | | SEPARATION POINTS OF ray 2 & ray 3, 4 |
| | | | | | | | SEPARATION POINTS OF ray 3 & 4 |
| | | | 15.82 | −6.99 | 4.145 | −11 | |
| | | | | | | | COVER GLASS |
| | | | −15.8 | 6.995 | −4.15 | 11.01 | |

| | LY | LM | LC | LK |
|---|---|---|---|---|
| DISTANCE BETWEEN DEFLECTING MEANS REFLECTION SURFACE AND FIRST MIRROR | 72.8 | 72.8 | 72.8 | 72.8 |
| DISTANCE BETWEEN FIRST MIRROR AND SECOND MIRROR | 180.0 | 179.5 | 179.0 | 178.6 |
| OPTICAL PATH LENGTH BETWEEN LAST ELEMENT AND IMAGE PLANE | 402.7 | 403.3 | 403.8 | 404.2 |
| OPTICAL PATH LENGTH BETWEEN DEFLECTOR REFLECTION POINT AND LAST ELEMENT | 252.8 | 252.3 | 251.8 | 251.4 |
| SUB-SCANNING DIRECTION LATERAL MAGNIFICATION β | 0.241 | 0.319 | 0.332 | 0.378 |
| (OPTICAL PATH LENGTH BETWEEN LAST ELEMENT AND IMAGE PLANE)/ (OPTICAL PATH LENGTH BETWEEN DEFLECTOR REFLECTION POINT AND LAST ELEMENT) | 1.593 | 1.599 | 1.604 | 1.608 |
| 2 × β | 0.483 | 0.637 | 0.664 | 0.756 |

TABLE 3 fθ MIRROR SURFACE SHAPE IS:
$x = (cuy * y^2 + cuz * z^2)/(1 + \text{Sqrt}(1 - ay * cuy^2 * y^2 - az * cuz^2 * z^2)) + \Sigma a l\_m * y^l * z^m$
(HERE, y IS MAIN SCANNING DIRECTION POSITION AND z IS SUB-SCANNING DIRECTION POSITION)
SURFACE SHAPE 1: EXPRESSED BY fθ$_1$ MIRROR SURFACE
(HERE, X IS LIGHT ADVANCING DIRECTION AND LIGHT ADVANCING DIRECTION IS NEGATIVE)

| | |
|---|---|
| cuy = | −0.001298 |
| ay = | 1 |
| cuz = | −0.045233613 |
| az = | 1 |
| a|m | |

TABLE 3-continued

|  | MAIN SCANNING | SUB-SCANNING |
|---|---|---|
| CURVATURE(1/mm) | −0.000207892 | −0.023119466 |
| POWER(1/mm) | −0.000415785 | −0.046238933 |

(ABOVE VALUES ARE VALUES FOR y = 0 AND z = 0)

| | | | l | | |
|---|---|---|---|---|---|
| m | 0 | 1 | 2 | 3 | 4 |
| 0 | 0 | −0.00206683 | 0.000545054 | 7.26704E−08 | 3.08501E−09 |
| 1 | −8.93819E−06 | 2.32865E−07 | 3.07944E−08 | 4.15375E−10 | 9.94095E−12 |
| 2 | −0.034196823 | 1.02196E−05 | 9.81503E−07 | −2.07655E−09 | −6.22684E−11 |
| 3 | −0.000776256 | 1.52987E−06 | 1.4523E−07 | −2.74225E−10 | −5.49835E−12 |
| 4 | −2.42069E−05 | 3.46974E−07 | 2.18973E−08 | −1.45232E−10 | −6.91923E−12 |

SURFACE SHAPE 2: EXPRESSED BY $f\theta_2$ MIRROR SURFACE
(HERE, X IS LIGHT ADVANCING DIRECTION AND LIGHT ADVANCING DIRECTION IS POSITIVE)

| | |
|---|---|
| cuy = | −0.000707071 |
| ay = | 1 |
| cuz = | −0.003214468 |
| az = | 1 |
| a|m | |

|  | MAIN SCANNING | SUB-SCANNING |
|---|---|---|
| CURVATURE(1/mm) | −0.001359664 | −0.003836359 |
| POWER(1/mm) | 0.002719329 | 0.007672717 |

(ABOVE VALUES ARE VALUES FOR y = 0 AND z = 0)

| | | | | l | | |
|---|---|---|---|---|---|---|
| m | 0 | 1 | 2 | 3 | 4 | 5 | 6 |
| 0 | 0 | −0.009337019 | −0.000328297 | 1.43887E−09 | 1.51456E−10 | −8.12379E−14 | −1.12596E−15 |
| 1 | −7.00891E−07 | 2.37299E−09 | −8.48449E−11 | −2.63011E−13 | 6.14244E−14 | 6.56992E−18 | −2.95583E−18 |
| 2 | −0.000310946 | −3.58979E−08 | −1.30252E−09 | −1.52789E−13 | 3.87818E−15 | 9.00869E−18 | −4.10548E−19 |
| 3 | −1.66409E−07 | 1.88245E−10 | −2.8796E−12 | −1.32363E−14 | −8.83673E−17 | −4.1485E−19 | 7.05164E−21 |
| 4 | 254889E−09 | −2.8233E−12 | −9.59869E−15 | 4.3316E−16 | −1.16677E−19 | 2.09744E−21 | 3.53892E−23 |
| 5 | −1.23795E−10 | −4.52955E−14 | 2.71012E−17 | −3.31578E−18 | −4.51373E−20 | 1.99798E−23 | −9.21395E−25 |
| 6 | 902745E−13 | 6.78185E−16 | 1.03582E−19 | −3.43382E−22 | 7.78458E−22 | −8.26785E−27 | −2.99594E−27 |

|  |  |
|---|---|
| MIRROR DISTANCE d(mm) | 178.4516422 |
| d1 | 72.34089686 |

|  | MAIN SCANNING | SUB-SCANNING |
|---|---|---|
| COMBINED POWER $\phi_1$(1/mm) | 0.002505311 | 0.024744548 |
| LINEAR EXPANSION COEFFICIENT RATIO $\alpha_{1i}/\alpha_2$ | 7.546774113 | 22.78585625 |
| $\Delta_1$(mm) | 193.6959637 | 55.33376577 |
| $\Delta_2$(mm) | 29.61607324 | 333.4639054 |

(ABOVE VALUES ARE VALUES FOR y = 0 AND z = 0)
Δ: DISTANCE OF OBJECT POINT SIDE PRINCIPAL POINT FROM FIRST MIRROR (POSITIVE AT DOWNSTREAM SIDE OF OPTICAL PATH)
Δ': DISTANCE OF IMAGE SIDE PRINCIPAL POINT FROM SECOND MIRROR (POSITIVE AT DOWNSTREAM SIDE OF OPTICAL PATH)

LINEAR EXPANSION COEFFICIENT RATIO (1/DEGREE)

|  |  |
|---|---|
| PMMA | 0.000069 |
| PC | 0.000062 |
| GLASS | 0.0000072 |

WHEN MATERIAL OF SECOND MIRROR IS PC

|  | MAIN SCANNING | SUB-SCANNING |
|---|---|---|
| $\alpha_{1i}$ | 0.0004679 | 0.001412723 |
| $|\alpha_2 - \alpha_{1i}|$ | 0.0004059 | 0.001350723 |
| $|\alpha_1 - \alpha_{1j}|$ | 0.0003989 | 0.001343723 |

TABLE 3-continued

WHEN MATERIAL OF SECOND MIRROR IS GLASS

| | MAIN SCANNING | SUB-SCANNING |
|---|---|---|
| $\alpha_{1i}$ | 5.43368E−05 | 0.000164058 |
| $|\alpha_2 - \alpha_{1i}|$ | 7.66323E−06 | 0.000102058 |
| $|\alpha_1 - \alpha_{1j}|$ | 1.46632E−05 | 9.50582E−05 |

TABLE 4

| | |
|---|---|
| WAVELENGTH | 0.00067 mm |
| DEFLECTION ANGLE | 23.51 DEGREES |
| RADIUS OF INSCRIBED CIRCLE OF ROTATING POLYGON MIRROR | 23.76 mm |
| ROTATION CENTER OF ROTATING POLYGON MIRROR y | 22.01 mm |
| ROTATION CENTER OF ROTATING POLYGON MIRROR x | 8.969 mm |
| NUMBER OF FACETS OF ROTATING POLYGON MIRROR | 8 FACETS |

| | FINITE LENS | | | |
|---|---|---|---|---|
| | LY | LM | LC | LK |
| IMAGING POSITION | 5707 | 5407 | 5164.4 | 4995.4 |

| | THICKNESS (mm) | | | | CURVATURE (1/mm) | | MATERIAL | DECENTER (mm) | | | | |
|---|---|---|---|---|---|---|---|---|---|---|---|---|
| | | | | | MAIN SCANNING DIRECTION | SUB-SCANNING DIRECTION | | y | LY | LM | LC | LK |
| | LY | LM | LC | LK | | | | | | | | |
| PRE-DEFLECTION OPTICAL SYSTEM | 50 | ← | ← | ← | 0 | 0.0116 | air | | | | | |
| | 5 | ← | ← | ← | 0 | 0 | BK7 | | | | | |
| | 157.2 | 150 | 157.1 | 160.4 | | | air | | | | | |
| | 2 | ← | ← | ← | | | BK7 | −0.97 | −1.8 | −2.44 | −2.92 | −3.51 |
| | 8 | ← | ← | ← | | | air | | | | | |

| | TILT (DEGREES) | | | | | |
|---|---|---|---|---|---|---|
| | AROUND z-AXIS | AROUND y-AXIS | | | | REMARKS |
| | | LY | LM | LC | LK | |
| PRE-DEFLECTION OPTICAL SYSTEM | | | | | | |
| | | −4.12 | −3.09 | −2.11 | −0.98 | CYLINDER LENS |
| | −41.5 | | | | | |
| | | | | | | COVER GLASS |
| | 41.51 | | | | | |

TABLE 5

| | THICKNESS (mm) | | | | CURVATURE) (1/mm) | | MATERIAL | DECENTER (mm) | |
|---|---|---|---|---|---|---|---|---|---|
| | LY | LM | LC | LK | MAIN SCANNING DIRECTION | SUB-SCANNING DIRECTION | | y | z |
| POST-DEFLECTION OPTICAL SYSTEM | −43.0711 | | | | | | air | | |
| | −2 | | | | | | BK7 | 6.701 | |
| | −8 | | | | | | air | | |
| | | | | | SURFACE SHAPE 1 | | PMMA | | 2.009 |
| | | | | | | | | | −2.01 |
| | 177.8382 | | | | | | air | | |
| | | | | | | | | | 11.55 |
| | | | | | SURFACE SHAPE 2 | | PC | | |
| | | | | | | | | | −11.6 |
| | −71.6805 | | | | | | air | | |

TABLE 5-continued

| | | | | | | | |
|---|---|---|---|---|---|---|---|
| −80 | | | | | | | air |
| −80 | | | | | | | air |
| −0.18948 | | | | | | | air |
| −1.99997 | | | | | | | BK7 |
| −170.322 | −170 | −169.919 | −169.928 | | | | air |

| | | TILT (DEGREES) | | | | | |
|---|---|---|---|---|---|---|---|
| | | AROUND z-AXIS | AROUND y-AXIS | | | | REMARKS |
| | | | LY | LM | LC | LK | |
| | POST-DEFLECTION OPTICAL SYSTEM | −41.5 | | | | | |
| | | | | | | | COVER GLASS |
| | | 1.533 | | | | | |
| | | | | | | | FIRST MIRROR |
| | | −1.53 | | | | | |
| | | 2.862 | | | | | |
| | | | | | | | SECOND MIRROR |
| | | −2.86 | | | | | |
| | | | | | | | SEPARATION POINTS OF ray 1 & ray 2, 3, 4 |
| | | | | | | | SEPARATION POINTS OF ray 2 & ray 3, 4 |
| | | | | | | | SEPARATION POINTS OF ray 3 & 4 |
| | | | 14.34 | 1.438 | −4.73 | −10.5 | |
| | | | | | | | COVER GLASS |
| | | | −14.3 | −1.44 | 4.734 | 10.54 | |

| | LY | LM | LC | LK |
|---|---|---|---|---|
| DISTANCE BETWEEN DEFLECTING MEANS REFLECTION SURFACE AND FIRST MIRROR | 53.6 | 53.6 | 53.6 | 53.6 |
| DISTANCE BETWEEN FIRST MIRROR AND SECOND MIRROR | 179.7 | 179.1 | 178.6 | 178.2 |
| OPTICAL PATH LENGTH BETWEEN LAST ELEMENT AND IMAGE PLANE | 403.1 | 403.7 | 404.1 | 404.4 |
| OPTICAL PATH LENGTH BETWEEN DEFLECTOR REFLECTION POINT AND LAST ELEMENT | 233.3 | 232.7 | 232.2 | 231.8 |
| SUB-SCANNING DIRECTION LATERAL MAGNIFICATION β | 0.391 | 0.455 | 0.437 | 0.45 |
| (OPTICAL PATH LENGTH BETWEEN LAST ELEMENT AND IMAGE PLANE)/ (OPTICAL PATH LENGTH BETWEEN DEFLECTOR REFLECTION POINT AND LAST ELEMENT) | 1.728 | 1.735 | 1.74 | 1.744 |
| 2 × β | 0.782 | 0.909 | 0.874 | 0.901 |

TABLE 6 fθ MIRROR SURFACE SHAPE IS:
$x = (cuy * y^2 + cuz * z^2)/(1 + Sqrt(1 - ay * cuy^2 * y^2 - az * cuz^2 * z^2)) + \Sigma a l\_m * y^l * z^m$
(HERE, y IS MAIN SCANNING DIRECTION POSITION AND z IS SUB-SCANNING DIRECTION POSITION)
SURFACE SHAPE 1: EXPRESSED BY fθ$_1$ MIRROR SURFACE
(HERE, X IS LIGHT ADVANCING DIRECTION AND LIGHT ADVANCING DIRECTION IS NEGATIVE)

| | | |
|---|---|---|
| cuy = | | −0.001326596 |
| ay = | | 1 |
| cuz = | | 0.052941248 |
| az = | | 1 |
| a\_m | | |

| | MAIN SCANNING | SUB-SCANNING |
|---|---|---|
| CURVATURE(1/mm) | −0.000244389 | −0.017233148 |
| POWER(1/mm) | −0.000488778 | −0.034466297 |

(ABOVE VALUES ARE VALUES FOR y = 0 AND z = 0)

| | | | 1 | | |
|---|---|---|---|---|---|
| m | 0 | 1 | 2 | 3 | 4 |
| 0 | 0 | −0.002427795 | 0.000541103 | 7.11189E−08 | 3.30313E−09 |
| 1 | 1.3329E−05 | −1.74351E−07 | 6.02557E−08 | 2.65446E−09 | 5.11429E−11 |
| 2 | −0.03510313 | 8.063E−06 | 9.46338E−07 | −1.73513E−09 | −5.17828E−11 |

TABLE 6-continued

| | | | | | | |
|---|---|---|---|---|---|---|
| 3 | −0.000751183 | 9.35146E−07 | 1.10082E−07 | −1.76909E−10 | −2.02284E−12 | |
| 4 | −1.78810E−05 | 1.61883E−07 | 1.22368E−08 | −9.49898E−11 | −5.2885E−12 | |

SURFACE SHAPE 2: EXPRESSED BY fθ$_2$ MIRROR SURFACE
(HERE, X IS LIGHT ADVANCING DIRECTION AND LIGHT ADVANCING DIRECTION IS POSITIVE)

| | |
|---|---|
| cuy = | −0.000711584 |
| ay = | 1 |
| cuz = | −0.003212359 |
| az = | 1 |
| a/m | |

| | MAIN SCANNING | SUB-SCANNING |
|---|---|---|
| CURVATURE(1/mm) | −0.00136577 | −0.00383091 |
| POWER(1/mm) | 0.00273154 | 0.00766182 |

(ABOVE VALUES ARE VALUES FOR y = 0 AND z = 0)

| m | 0 | 1 | 2 | 3 | 4 | 5 | 6 |
|---|---|---|---|---|---|---|---|
| 0 | 0 | −0.008724356 | −0.000327093 | 2.45125E−09 | 1.8076E−10 | −7.5549E−14 | −1.39044E−15 |
| 1 | 1.239E−06 | −1.22543E−08 | −2.35134E−10 | 1.03423E−12 | 8.75056E−14 | 5.177E−17 | −4.1014E−18 |
| 2 | −0.000309276 | 3.66636E−08 | −1.32592E−09 | −3.74832E−14 | 1.59732E−15 | 1.17197E−17 | −5.38111E−19 |
| 3 | −1.50485E−07 | 2.02388E−10 | −2.98797E−12 | −1.33613E−14 | −1.00515E−16 | −4.75541E−19 | 8.24356E−21 |
| 4 | 2.66691E−09 | −1.86728E−12 | 1.79802E−15 | 3.97631E−16 | 5.37273E−19 | 3.68434E−21 | 8.92435E−23 |
| 5 | −1.23659E−10 | −4.14635E−14 | 1.57252E−16 | −3.73123E−18 | −3.90642E−20 | 2.88124E−23 | −5.64685E−25 |
| 6 | 8.26683E−13 | 4.68218E−16 | −2.98127E−18 | 6.04063E−21 | 5.74451E−22 | −2.42897E−25 | −1.82472E−26 |

| | |
|---|---|
| MIRROR DISTANCE d(mm) | 178.09409 |
| d1 | 53.07108032 |

| | MAIN SCANNING | SUB-SCANNING |
|---|---|---|
| COMBINED POWER φ$_1$ (1/mm) | 0.002480539 | 0.020225644 |
| LINEAR EXPANSION COEFFICIENT RATIO α$_{1i}$/α$_2$ | 6.603795947 | 24.48049553 |
| Δ$_1$(mm) | 196.1151424 | 67.46509164 |
| Δ$_2$(mm) | 35.09258245 | 303.4881782 |

(ABOVE VALUES ARE VALUES FOR y = 0 AND z = 0)
Δ: DISTANCE OF OBJECT POINT SIDE PRINCIPAL POINT FROM FIRST MIRROR (POSITIVE AT DOWNSTREAM SIDE OF OPTICAL PATH)
Δ': DISTANCE OF IMAGE SIDE PRINCIPAL POINT FROM SECOND MIRROR (POSITIVE AT DOWNSTREAM SIDE OF OPTICAL PATH)
LINEAR EXPANSION COEFFICIENT RATIO (1/DEGREE)

| | |
|---|---|
| PMMA | 0.000069 |
| PC | 0.000062 |
| GLASS | 0.0000072 |

WHEN MATERIAL OF SECOND MIRROR IS PC

| | MAIN SCANNING | SUB-SCANNING |
|---|---|---|
| α$_{1i}$ | 0.000409435 | 0.001517791 |
| \|α$_2$ − α$_{1i}$\| | 0.000347435 | 0.001455791 |
| \|α$_1$ − α$_{1j}$\| | 0.000340435 | 0.001448791 |

WHEN MATERIAL OF SECOND MIRROR IS GLASS

| | MAIN SCANNING | SUB-SCANNING |
|---|---|---|
| α$_{1i}$ | 4.75473E−05 | 0.00017626 |
| \|α$_2$ − α$_{1i}$\| | 1.44527E−05 | 0.00011426 |
| \|α$_1$ − α$_{1j}$\| | 2.14527E−05 | 0.00010726 |

What is claimed is:

1. An optical beam scanning device, comprising: a rotating polygon mirror for scanning a beam from a pre-deflection optical system in a main scanning direction; and two mirrors for imaging the beam scanned by the rotating polygon mirror on an image plane, and assuming that a linear expansion coefficient of the first mirror at the rotating polygon mirror side is α$_1$ and a linear expansion coefficient of the first mirror at the image plane side is α$_2$, respective powers in the main scanning direction are φ$_{10}$ and φ$_{20}$, and respective powers in the sub-scanning direction are φ'$_{10}$ and φ'$_{20}$, an optical path length between the two mirrors is d$_2$, and an optical path length between a reflection point of a deflector and the first mirror is d$_1$, having the relationships:

$|α_2 − α_{1i}| > |α_1 − α_{1i}|$ and $|\alpha_2-\alpha'_{1i}|>|\alpha_1-\alpha'_{1i}|$ here, $$\alpha_{1i}=-\alpha_2(-1+d_2\phi_{10})^2\phi_{20}/\phi_{10}$$

$$\alpha'_{1i}=-\alpha_2(-d_2-d_1+d_2d_1\phi'_{10})^2\phi_{20}/(d_1^2\phi'_{10}).$$

2. An optical beam scanning device comprising a rotating polygon mirror for scanning a beam from a pre-deflection optical system in a main scanning direction and two mirrors for imaging the beam scanned by the rotating polygon mirror on an image plane, wherein a first mirror at the rotating polygon mirror side has negative powers in the main scanning direction and a sub-scanning direction and a second mirror at the image plane side has positive powers in the main scanning direction and the sub-scanning direction, and the respective mirrors are asymmetric in the sub-scanning direction and have curves in the main scanning direction and the sub-scanning direction changed according to positions in the main scanning direction and the sub-scanning direction, wherein an absolute value of the power of first mirror in the sub-scanning direction is larger than an absolute value of the power of second mirror in the sub-scanning direction, the first mirror is displaced in one of directions of sub-scan orientation and the second mirror is displaced in the one direction of sub-scan orientation similarly to the first mirror, and a beam reflected by the second mirror passes through the one direction of the sub-scan orientation of the first mirror, and wherein optical paths, the powers and the lateral magnification in the sub-scanning direction of the respective mirrors are set in the relationships:

[(optical path length between the second mirror and the image plane)/(optical path length between the deflector reflection point and the last element)]>(2×lateral magnification in the sub-scanning direction)

lateral magnification in the sub-scanning direction <0.5

[(optical path length between the second mirror and the image plane)/(optical path length between the deflector reflection point and the second mirror)]>1.5.

3. An optical beam scanning device comprising:

a rotating polygon mirror for scanning a beam from a pre-deflection optical system in a main scanning direction; and two mirrors for imaging the beam scanned by the rotating polygon mirror on an image plane, wherein a first mirror at the rotating polygon mirror or side has a negative power in the main scanning direction and has convex shapes in the main scanning direction and the sub-scanning direction, and a second mirror at the image plane side has a positive power in the main scanning direction and has concave shapes in the main scanning direction and the sub-scanning direction, wherein the first mirror is displaced in one of directions of sub-scan orientation and the second mirror is displaced in the one direction of sub-scan orientation similarly to the first mirror, and a beam reflected by the second mirror passes through the one direction of the sub-scan orientation of the first mirror, and wherein a sub-scanning direction power of the first optical element is set negative and a sub-scanning direction power of the second optical element is set positive, and optical paths, powers and lateral magnification in the sub-scanning direction of the pair of optical elements are set in the relationships:

[(optical path length between the second mirror and the image plane)/(optical path length between the deflector reflection point and the last element)]>(2×lateral magnification in the sub-scanning direction)

lateral magnification in the sub-scanning direction <0.5

[(optical path length between the second mirror and the image plane)/(optical path length between the deflector reflection point and the second mirror)]>1.5.

4. An optical beam scanning device, comprising:

a rotating polygon mirror for scanning a beam from a pre-deflection optical system in a main scanning direction; and two mirrors for imaging the beam scanned by the rotating polygon mirror on an image plane, wherein a first mirror at the rotating polygon mirror side has a negative power in the main scanning direction and a second mirror at the image plane side has a positive power in the main scanning direction, and the second mirror is displaced in one of directions of sub-scan orientation relative to the first mirror, a beam reflected by the second mirror passes through the same direction as the one direction of the sub-scan orientation of the first mirror, a sub-scanning direction power of a first optical element is set negative and a sub-scanning direction power of a second optical element is set positive, and optical paths, powers and lateral magnification in the sub-scanning direction of the pair of optical elements are set in the relationships:

[(optical path length between the second mirror and the image plane)/(optical path length between the deflector reflection point and the last element)]>(2×lateral magnification in the sub-scanning direction)

lateral magnification in the sub-scanning direction <0.5

[(optical path length between the second mirror and the image plane)/(optical path length between the deflector reflection point and the second mirror)]>1.5.

* * * * *